(12) United States Patent
Andrews et al.

(10) Patent No.: US 6,965,368 B1
(45) Date of Patent: Nov. 15, 2005

(54) GAME CONTROL DEVICE HAVING GENRE DATA

(75) Inventors: Marcus J. Andrews, Redmond, WA (US); Firdosh K. Bhesania, Kirkland, WA (US); Doron J. Holan, Kirkland, WA (US); Robert Ingman, Seattle, WA (US); Scott R. Leatham, Duvall, WA (US); Ervin Peretz, Redmond, WA (US); Kenneth D. Ray, Redmond, WA (US); Om K. Sharma, Kirkland, WA (US); James E. Veres, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 09/497,914

(22) Filed: Feb. 4, 2000

Related U.S. Application Data

(63) Continuation-in-part of application No. 09/483,113, filed on Jan. 14, 2000.
(60) Provisional application No. 60/127,972, filed on Apr. 6, 1999.

(51) Int. Cl.[7] .............................. G09G 5/00; G09G 5/09; G06F 3/00; G06F 13/00
(52) U.S. Cl. ........................ 345/156; 345/161; 345/168; 463/36; 463/37; 463/38; 710/5; 710/62; 710/313
(58) Field of Search .................................. 345/156, 161, 345/168; 463/36, 37, 38; 709/321; 710/129, 63, 62, 5, 313; 711/100; 713/201; 395/275; 340/706

(56) References Cited

U.S. PATENT DOCUMENTS

| | | | | |
|---|---|---|---|---|
| 5,157,384 A | * | 10/1992 | Greanias et al. ............ | 340/706 |
| 5,317,695 A | * | 5/1994 | Celi, Jr. ...................... | 395/275 |
| 5,442,376 A | * | 8/1995 | Tannenbaum et al. ...... | 345/156 |
| 5,807,175 A | * | 9/1998 | Daviis et al. ................ | 463/36 |
| 5,838,307 A | | 11/1998 | Bouton ....................... | 345/168 |
| 5,935,224 A | * | 8/1999 | Svancarek et al. ............ | 463/36 |
| 6,073,205 A | * | 6/2000 | Thomson .................... | 711/100 |
| 6,085,265 A | * | 7/2000 | Kou ............................ | 710/63 |
| 6,195,712 B1 | * | 2/2001 | Pawlowski et al. ......... | 345/156 |
| 6,223,289 B1 | * | 4/2001 | Wall et al. .................. | 713/201 |
| 6,263,392 B1 | * | 7/2001 | McCauley .................. | 710/129 |
| 6,311,228 B1 | * | 10/2001 | Ray ............................. | 709/321 |

FOREIGN PATENT DOCUMENTS

| | | |
|---|---|---|
| EP | 0 394 614 | 10/1990 |
| GB | 2 241 474 | 9/1991 |
| WO | WO 98/57719 | 12/1998 |

OTHER PUBLICATIONS

Universal Serial Bus (USB) HID Usage Tables, Jun. 27, 2001, Version 1.11, 1996–2001 USB Implementers Forum.*
Apple Computer, Inc., Apple Game Sprockets Guide, 1996, 3, 3/5–3/68 (84 total pages).
"USB Device Framework", Revision 1.1, Chapter 9, Universal Serial Bus Specification, Sep. 1998.
"Universal Serial Bus Common Class Specification", SystemSoft Corporation, Intel Corporation, Dec. 1997.
"Universal Serial Bus (USB). Device Class Definition for Human Interface Devices (HID)," 1996–1999 USB Implementers' Forum.

* cited by examiner

*Primary Examiner*—Bipin Shalwala
*Assistant Examiner*—David L. Lewis
(74) *Attorney, Agent, or Firm*—Woodcock Washburn LLP

(57) ABSTRACT

A computer peripheral has a processor, non-volatile memory, and a plurality of controls. The non-volatile memory holds control mappings corresponding to a plurality of application program genres. The control mappings indicate actions to be performed in application programs of particular genres in response to actuation of particular controls. The control mappings indicate controls by unique string indexes that are also used in HID control descriptors associated with the computer peripheral.

53 Claims, 12 Drawing Sheets

Figure 4

A-S Correlation 231

| ACTION IN APPLICATION 36a | SEMANTIC |
|---|---|
| turn left or right | STEER |
| speed up | ACCELERATE |
| slow down | DECELERATE |
| change to next higher gear | SHIFT UP |
| fire machine guns | FIRE |
| change dash display | DASHBOARD |
| feedback | RUMBLE |
| . . . | . . . |

Figure 3

C-S Correlation 221

| CONTROL ON DEVICE 66 | SEMANTIC |
|---|---|
| Trigger 1 | FIRE |
| Button 1 | SHIFT UP |
| Steering Wheel | STEER |
| Right Pedal | ACCELERATE |
| Left Pedal | DECELERATE |
| Button 2 | TALK |
| Vibrate | RUMBLE |
| . . . | . . . |

US 6,965,368 B1

GAME CONTROL DEVICE HAVING GENRE DATA

RELATED APPLICATIONS

This is a continuation-in-part application of a prior U.S. patent application filed Jan. 14, 2000, titled "System and Method for Mapping Input Device Controls to Software Actions," Ser. No. 09/483,113 (now patent No. 6,727,884), which claims the benefit of U.S. Provisional Appl. 60/127,972 filed Apr. 6, 1999, and entitled "A System for Mapping Input-Device Functions to Software Application Input Commands". Priority is hereby claimed to these earlier applications.

TECHNICAL FIELD

This invention relates generally to the use of peripheral input devices with software applications and more specifically to the use of genres in conjunction with such input devices and software applications.

BACKGROUND

Various input devices are available that permit a computer user to communicate with a computer. A typical personal computer offers input devices such as a keyboard and a mouse. Numerous other devices are available, such as drawing pads, joysticks, and steering wheels (for use with driving games). These devices can be connected to a computer, and they permit the user to communicate information to the computer; the information communicated instructs software applications running on the computer to perform specified actions.

Ideally, a computer user loads a software application, connects an appropriate device to the computer, and the device and software work together without further configuration by the user. This ideal, however, has not been realized in prior systems.

In order for a device to work with a given software application, there must be a defined relationship between the controls on the device and actions that the software application performs. However, there are few standards governing the way in which this relationship is defined. Traditionally, software developers design software applications to support the most common devices and to provide a device mapping control panel for those users who own other devices. This approach, however, has drawbacks: A software developer who wants to design an application to work well with many devices must know what controls are available on each device (e.g., buttons, levers, etc.) and how the device notifies the computer system of operational events (e.g., an input of 1001 signifies the pressing of a button). Additionally, the software developer must make design decisions as to which devices the software will support, and, on those devices that will be supported, how the controls will map to the actions that the software performs. This is a labor-intensive process for the software developer. Moreover, if a user owns an unsupported device, the user must generally resort to mapping the unsupported device manually by referring to generic pictures and tables in an application's manual and using the device mapping control panel provided with the application. This is a notoriously difficult process.

Some input device manufacturers address the problem of ensuring that specific applications work well with the device by supplying a software component with the device that dynamically reconfigures the device based on guesses as to what actions the application expects the device to support. Some manufacturers of devices with newer features provide filters to accommodate existing applications; frequently, these filters simulate keyboard presses or mouse movements for games that do not recognize enhanced features of the new device. Alternatively, some devices are supplied with mapping software that detects the presence of certain applications on the system and configures the device to work better with those applications. However, these ad hoc approaches are error prone, may result in a relationship between device controls and software actions that feels unnatural to the user, and can only provide support for applications the device manufacturer knows about and chooses to support.

The Human Interface Device (HID) standard, defined in conjunction with the Universal Serial Bus (USB) standard, addresses problems such as these. Using HID, an input device can store information about its controls. This information can be obtained by a requesting application program.

HID data generally describes the characteristics of device controls and the format of data generated by the controls. In addition, HID allows different labels or "usages" to be assigned to the controls of an input device. For example, a button might be designated as a "fire" button, as "button1", "button2," etc. In addition, HID can include "aliases" for a control. A given control might have a plurality of aliases such as "button1," "fire," "torpedo," etc.

Usages and aliases, if used in a uniform and agreed upon way, provide useful hints about how to use a certain control on an input device. In some cases, for instance, the "fire" button will have an obviously corresponding action in an application program. In other cases, however, the usages and aliases might not correspond directly to any terminology known by the application program.

A further complicating factor is that there is no agreed upon standard for naming HID controls. Even if there were such a standard, it would remain—in may cases—a very difficult task for an application program to determine an optimum set of mappings between numerous input device controls and the actions available in the application program. A determination such as this would require a complex algorithm, tailored specifically for the application program.

The difficulty lies not in finding a workable control for a particular action, but in assigning a combination of controls to a combination of desired actions. For example, any number of controls might work for a "drop bomb" action: a "button1," a "button2," a "fire" button," a "trigger" button, etc. However, assigning the combination of these controls to a combination of different actions, such as "drop bomb," "start engine," "lower flaps," and "zoom" can be much more difficult. The task is actually made more difficult by the use of numerous aliases for each control—each control might duplicate the same aliases.

Accordingly, even with HID devices it is difficult for an application program to determine desirable control/action mappings for unanticipated input devices—input devices for which the application program does not have a pre-defined assignment of controls. The system described below solves this problem.

SUMMARY

Described below is a game control device or other computer peripheral that stores information relating to genres. This information can be retrieved by programs running on a host computer. The information includes sets of control-to-action mappings for the controls of the control device. There is a set for every supported genre. To establish a desirable combination of control-to-action mappings, the host computer simply requests the control mappings of the correct genre from the control device.

The described embodiment is implemented in a USB control device, which includes HID report descriptors. However, the genre data is maintained within the control device in a non-HID format. The genre data is correlated with the HID report descriptors by the use of unique string indexes within the HID report descriptors. More specifically, each control is given a unique string index within the HID data. The actions specified in the non-HID data use these same string indexes to specify controls.

BRIEF DESCRIPTION OF THE DRAWINGS

FIG. 3 is a block diagram showing a sample control-semantic correlation and its structure;

FIG. 4 is a block diagram showing a sample action-semantic correlation and its structure;

DETAILED DESCRIPTION

Computer Environment

Figure 1:
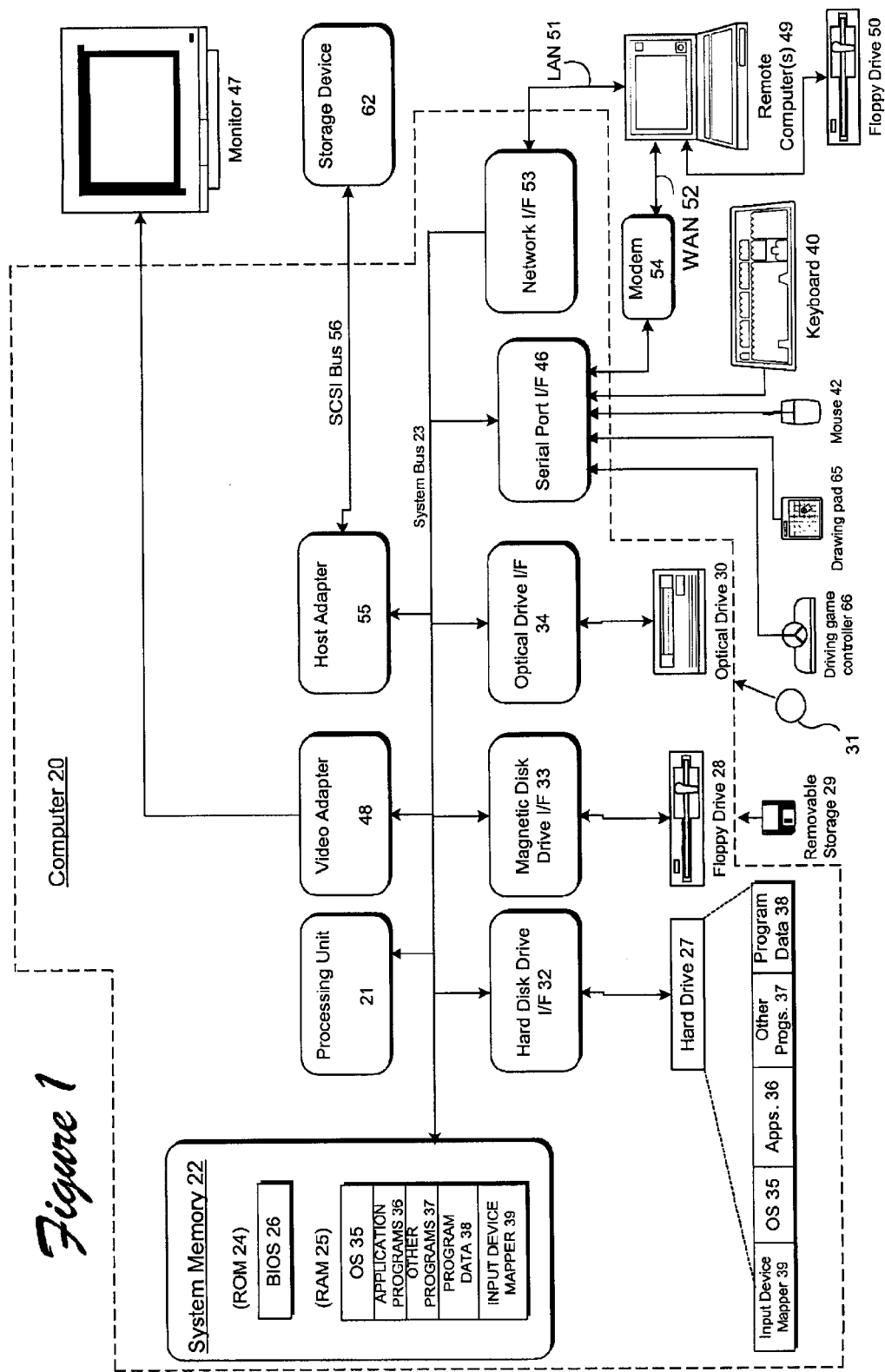
FIG. 1 is a block diagram representing a computer system in which aspects of the invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, home game machines, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37, program data 38, and an input device mapper 39. A user may enter commands and information into the personal computer 20 through input devices such as a keyboard 40, a pointing device 42, a drawing pad 65, or a game controller such as driving game controller 66. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port, universal serial bus (USB), or a 1394 high-speed serial port. A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Input Device Mapper

Figure 2:
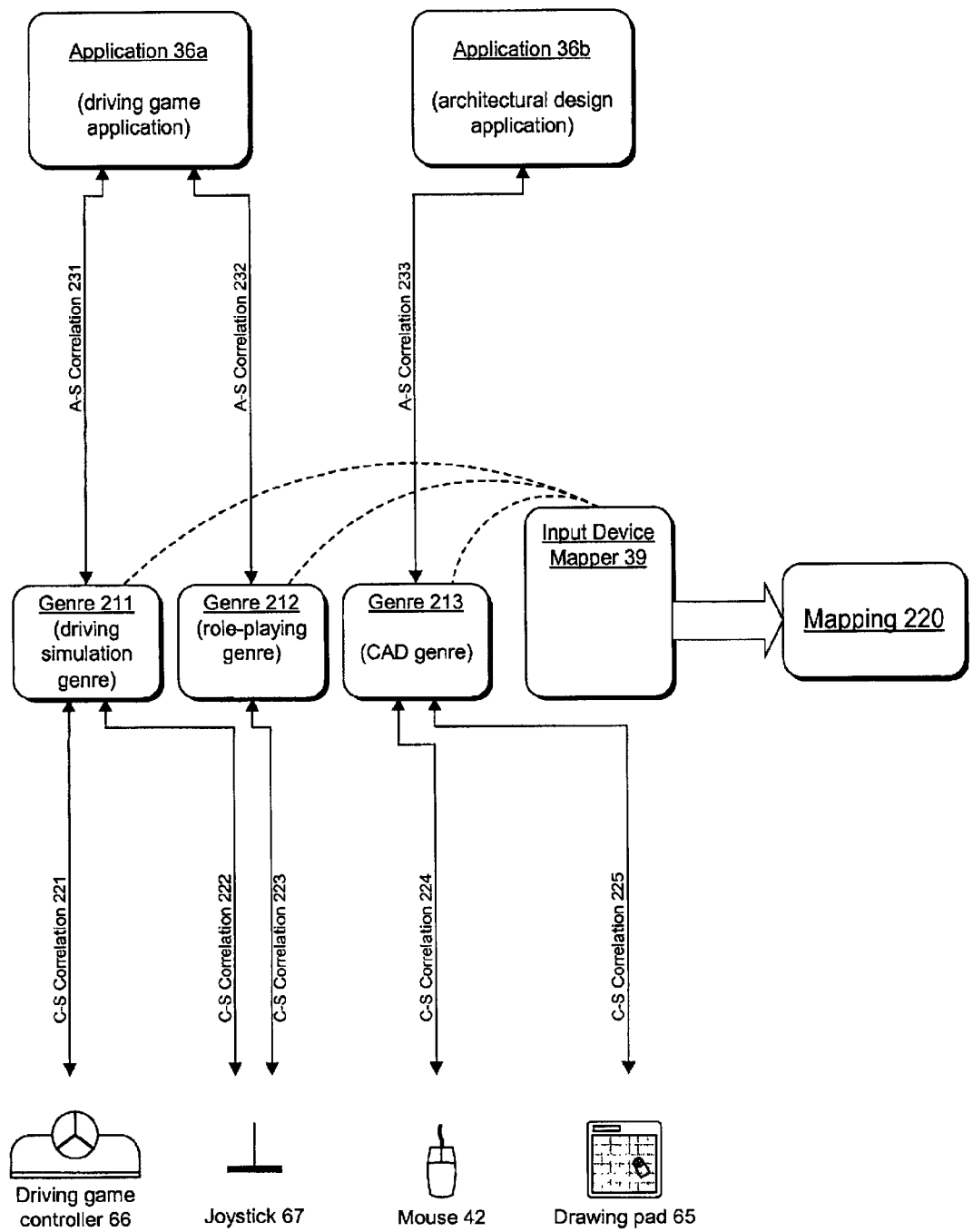
FIG. 2 is a block diagram showing the use of an input device mapper with input devices and software applications.

FIG. 2 depicts the use of an input device manager. Input device mapper 39 is a software module that provides an interface between application programs 36 and input devices, such as devices 42, 65, 66, and 67. Input device mapper 39 could be a system services component of an operating system running on computer 20, such as operating system 35, or a stand-alone software module, as shown in FIG. 2.

Input device mapper 39 is associated with one or more genre descriptions, such as genre descriptions 211–213. An application program genre is a collection of games having similarities in operation and input device usage. A genre description for a specific genre defines mappings between input device controls and actions to be performed in a game of the genre. These actions are defined in terms semantics or labels.

In the system described below, agreed upon genre semantics or labels are preferably publicized so that input device manufacturers and software developers can use input device mapper 39 in the manner described below to allow devices and software to work together. Specifically, a plurality of genres are defined and a set of possible actions is defined for each genre. This will be explained in more detail below.

In FIG. 2, genre description 211 corresponds to a "driving game" genre (corresponding to example genre 1 in the Examples section below). Genre description 212 corresponds to a "role playing" genre (corresponding to example genre 3 in the Examples section below). Genre description 213 corresponds to a "computer-aided design" (CAD) genre (corresponding to example genre 8 in the Examples section below).

Input devices 65, 66, 67, and 42 provide input device mapper 39 with correlations or control mappings between their controls and the semantics of genre descriptions 211–213, called "control-semantic" correlations 221–225 (abbreviated "C-S correlation"). C-S correlation 221, which is shown in detail in FIG. 3, correlates the controls on driving game controller 66 with semantics chosen from the driving simulation genre. Joystick 67 is appropriate for use with both driving simulation applications and role-playing applications. Therefore, joystick 67 provides two different C-S correlations: C-S correlation 222 provides a link to the controls on joystick 67 with the driving simulation genre, and C-S correlation 223 provides a link to the controls on joystick 67 with the role playing genre. Mouse 42 and drawing pad 65 provide C-S correlations 224 and 225, respectively, between their controls and the CAD genre.

A device may provide additional C-S correlations for specific purposes. For example, the manufacturer of driving game controller 66 may provide C-S correlation 221 which is appropriate for the driving simulation genre generally, but may also provide additional C-S correlations (not shown), which refine C-S correlation 221 for use with particular driving games. Each C-S correlation may specify the applications (e.g., the "XYZ" driving game) or classes of application (e.g., all applications in a driving simulation genre) with which it may be used.

Applications 36a and 36b provide input device mapper 39 with correlations between actions that they perform and available or predefined genres. These correlations are called "action-semantic" correlations ("A-S correlations"), and are referenced in FIG. 3 by numerals 231–233. Driving game application 36a provides A-S correlation 231, which is shown in detail in FIG. 4, between its actions and semantics selected from the defined semantics of the driving simulation genre. Architectural design application 36b provides an A-S correlation between its actions and the defined semantics of the CAD genre. In addition to A-S correlation 231, driving game application 36a also provides A-S correlation 232 between its actions and the defined semantics of the role-playing genre. Providing two different A-S correlations for a single application is appropriate when the application has two different phases that require different usage of the controls. For example, in driving game application 36a, the character begins by driving a car; this phase of the game is in driving simulation genre 211. Later, the character gets out of the car and explores on foot; this phase is in the role-playing genre 212.

Input device mapper 39 receives C-S correlations 221–225 and A-S correlations 231–233. Input device mapper 39 creates a mapping for each application program 36a, 36b, on computer 20. For example, in order to create mapping 220 for driving game application 36a, input device mapper 39 first selects an appropriate device for the driving game genre, by determining which devices have a C-S correlation for the driving simulation genre. If there is more than one device having a C-S correlation for driving simulation genre 211, such as driving game controller 66 and joystick 67, then input device mapper 39 selects one of these devices. The selection may be made in various ways, for example by selecting the first appropriate connected device that input device mapper 39 locates, or by consulting a database of preferred devices for each genre. For example, input device mapper 39 selects game controller 66 because it is the first device that it locates which supports driving simulation genre 211. Once the device is selected, input device mapper 39 uses C-S correlation 221 and A-S correlation 231 to map controls on game controller 66 into actions that driving game application 36a performs. Input device mapper 39 may create the mapping by performing a simple matching (i.e., by referring to C-S correlation 221 and A-S correlation 231 and linking each control with an action that is correlated with the same semantic), or it may take into account user preferences or overrides, as discussed below in the text accompanying FIG. 6.

Input device mapper may create a second mapping (not shown) for a different phase of an application that requires controls to be used in a different context, such as the role-playing phase of driving simulation game 36a. That mapping is created by selecting an appropriate device for the role-playing genre, such as joystick 67, and using C-S correlation 223 and A-S correlation 232 to map the controls on joystick 67 into the actions for the role-playing phase of game application 36a. Some applications change context frequently, such as a baseball game application, where the context of the controls is different for pitching than it is for batting. Preferably, these different contexts may be supported by a single genre; for example, the baseball genre shown below (example genre 6 in the Examples section) has different semantics for batting, pitching, and fielding.

FIG. 3 depicts the detail of sample C-S correlation 221. Controls 301 represent controls on driving game controller 66. Semantics 302 are semantics chosen from the driving simulation genre. C-S correlation 221 links controls 301 with semantics 302. In the example depicted by FIG. 3, "Trigger 1" on game controller 66 is associated with the semantic "FIRE", "Button 1" is associated with the semantic "SHIFT UP", etc.

FIG. 4 depicts the detail of sample A-S correlation 231. Actions 401 represent actions that driving game application program 236 can perform at the user's request. Semantics 402 are semantics chosen from driving simulation genre 211. In the example depicted by FIG. 4, the action performed by the driving game described as "turn left or right" is associated with the semantic "STEER", "speed up" is associated with the semantic "ACCELERATE", etc.

Figure 5:
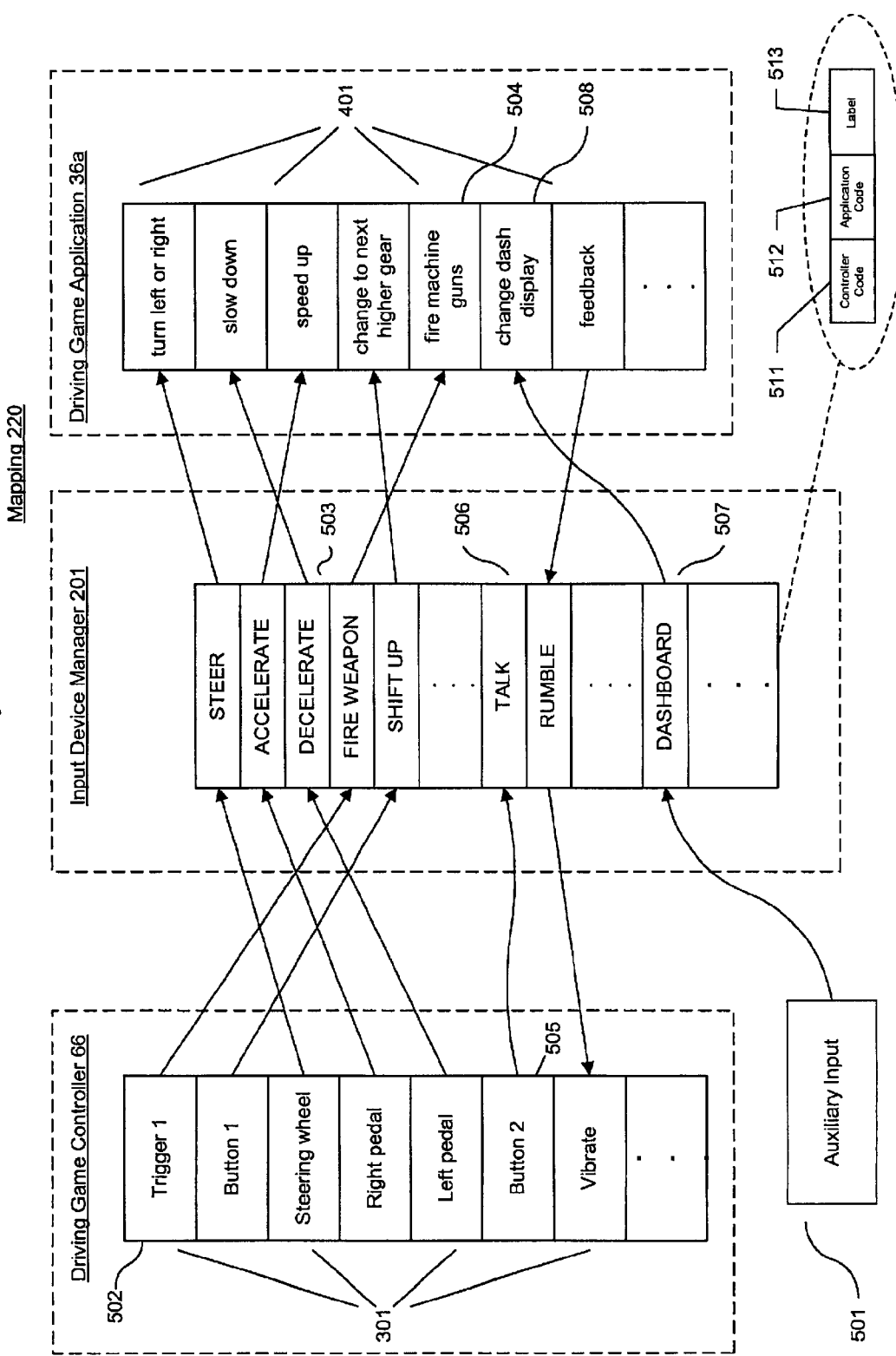
FIG. 5 is a block diagram showing a sample mapping created by an input device mapper.

FIG. 5 depicts a sample mapping 220 created by input device mapper 39, which links the controls on game controller 66 with actions performed by driving game application 36a. Controls 301 are correlated with semantics, as defined in C-S correlation 221. The semantics are correlated with software actions 401, as defined in A-S correlation 231. In the example, "trigger 1" 502 on game controller 66 is correlated with the semantic "FIRE" 503, which, in turn, is correlated with the software action "fire machine guns" 504.

The detail of an entry in the mapping is shown in items 511–513. Each entry contains a controller code 511, an application code 512, and a label 513. The controller code 511 is the data that an input device generates when a particular control has been operated. For example, the game controller could signify that trigger 1 has been pressed by generating the number "1002." The application code 512 is the item of input that an application expects to receive as an instruction to perform a particular action. For example, the input "64379" could instruct driving game application 36a to fire machine guns. Label 513 is a text string provided by application program 36a, which is a plain language description of the action that application program 36a will perform upon receiving application code 512 as its input. For example, "fire machine guns" is a label describing the action that will be performed by driving game application 36a when trigger 1 is depressed. The labels are helpful for displaying a graphic representation of the mapping, as described below in the text accompanying FIG. 6.

A mapping can be bi-directional. For example, it will be observed that mapping 220 shows a software action "feedback" 509 mapped into the "vibrate" control 511 on game controller 66 through the semantic "RUMBLE" 510. A genre, such as driving simulation genre 211, may contain semantics such as "RUMBLE," which represent functions that the device is able to perform at the request of an application. The direction of the arrows indicates that "feedback" is a command that driving game application 36a issues to game controller 66. For example, game controller 66 may be equipped with a mechanical device that vibrates the game controller, and driving game application 36a may wish to provide feedback to the game player in response to certain events, such as a car crash. In this case, driving game application 36a includes a feedback-RUMBLE link in A-S correlation 231. Similarly, driving game controller 66 includes a vibrate-RUMBLE link in C-S correlation 221. Input device mapper 39 links "feedback" to "vibrate" in mapping 220.

FIG. 5 also shows a control labeled "button 2" 505 on game controller 66, which is correlated with the semantic "TALK" 506, which might be appropriate for the action of operating a two-way radio to talk with other drivers. This correlation means that button 2 is mapped to an action correlated with the "TALK" semantic in an application that has such an action. Driving game application 36a, however, does not have an action correlated with the "TALK" semantic; therefore, button 2 on game controller 66 does not map to any action in driving game application 36a.

It will also be observed in FIG. 5 that mapping 220 uses a semantic "DASHBOARD" 507, which is correlated with the action in driving game application 36a of changing the dash display, and it will also be observed that game controller 66 does not have a control correlated with the "DASHBOARD" semantic. A feature of input device mapper 39 is that it provides an application with the model that all of the defined semantics in a genre are supported in any computer system on which the application may be running, such as computer 20. For example, even though game controller 66 does not have a control correlated with the "DASHBOARD" semantic, driving game 36a may still correlate its "change dash display" action with the semantic "DASHBOARD," and input device mapper 39 will locate an appropriate auxiliary input for that action. In mapping 220, auxiliary input 501 is selected by input device mapper 39 to implement the "DASHBOARD" semantic. Auxiliary input 501 may be a key on keyboard 40, an unused control on game controller 66 such as control 505, a pop-up menu that the user can control with pointing device 42, or any other mechanism by which the user can communicate with computer 20.

The genres may be defined such that some semantics must be mapped to the primary input device selected by input device mapper 39 and may not be mapped to an auxiliary input outside of that device. For example, in the genres provided below in the Examples section, controls are divided into the categories "priority 1" and "priority 2." A priority 1 control is a control that must be implemented on the primary input device and may not be implemented by an auxiliary input. A priority 2 control is a control that may be implemented on the primary input device, if a control is available. For example, in the genre "driving sim without weapons" shown in below in the Examples section, steering is a priority 1 control, so the "steer" semantic must be implemented on the primary input device selected by input device mapper 39, such as game controller 66. However, "dashboard" is a priority 2 control, so it may be implemented by any type of auxiliary input. Some other controls, which may be designated as "priority 3," are never implemented by the device used for the mapping, and therefore the genres do not define semantics to correlate with these controls. For example, a game application may provide a pop-up menu to change the resolution mode of the screen (640×480, 1024×768, etc), select the background music accompanying the game, select weapons to be carried, etc. Because no semantics are defined for priority 3 functions, they are implemented by the application directly rather than through input device mapper 39.

Figure 6:
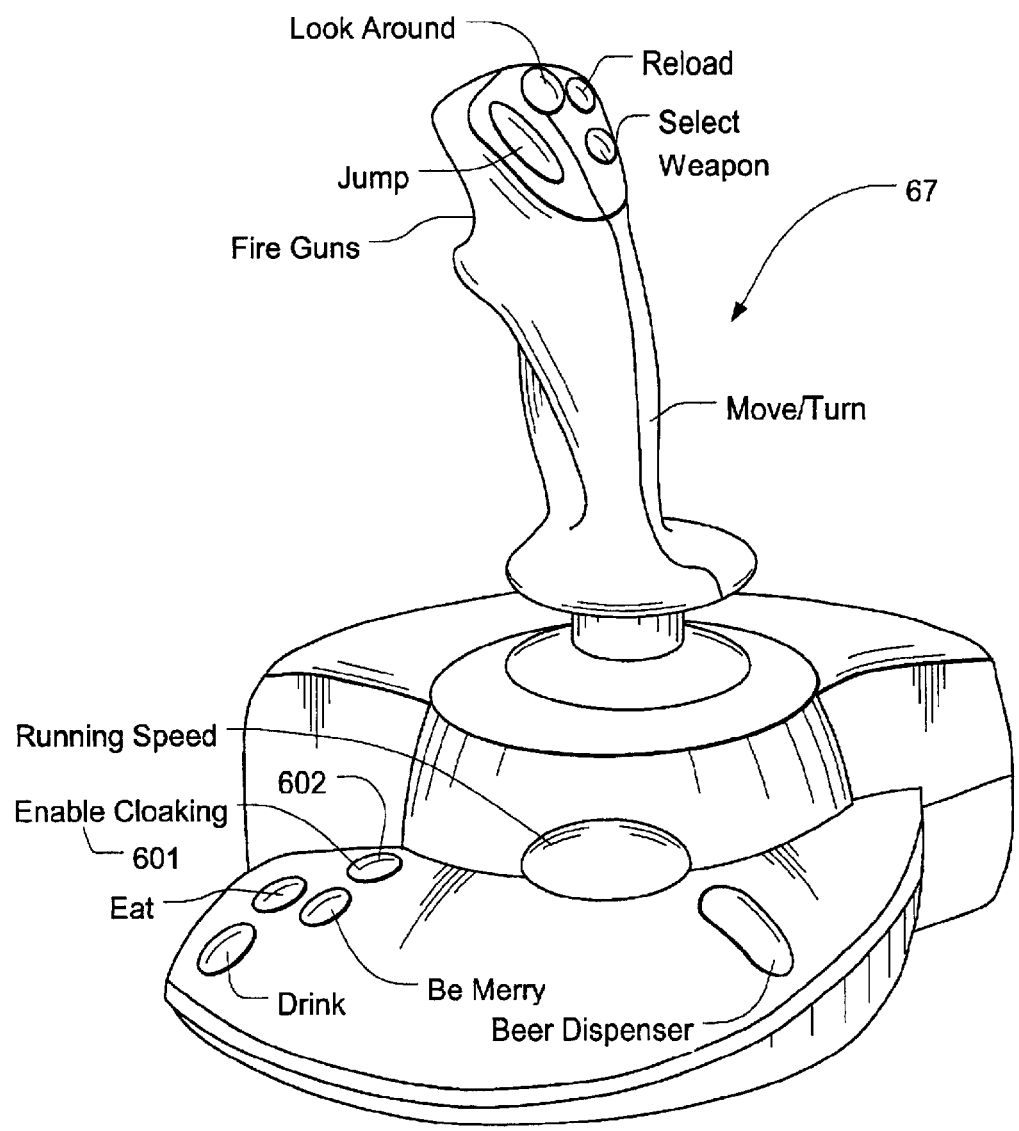
FIG. 6 is an image of an input device with action labels.

It is also possible for a user to affect a mapping created by input device mapper 39, either by providing a set of preferences for input device mapper 39 to take into account in creating the mapping, or by modifying a mapping after it has been created. For example, a user may create a set of preferences specifying that button 1 on game controller 66 should always map to the semantic "HONK_HORN" in every application falling into a driving simulation genre. A user may also modify a mapping that has been created: Input device mapper 39 may provide the user with a display showing the device controls that have been mapped to particular software actions, and may permit the user to change the mapping. FIG. 6 depicts such a display, as might appear for joystick 67. The manufacturer of joystick 67 may provide a bitmap image or 3D model of the device, with blank text fields that are filled in with data from the application. The data is provided by the application as part of the A-S correlation in the form of text strings; the application may provide a text string label for each action, and the labels may be displayed with an image of the device. For example, text field 601 is filled in with the text "enable cloaking device," which indicates that button 602 is mapped to a cloaking device action in the game application. This text string was provided to input device mapper 39 in an A-S correlation and becomes part of the mapping, as depicted in elements 511–513 in FIG. 5. The user can create a custom mapping, for example by using a mouse 42 to rearrange the labels on the displayed image of the device. If the user creates a custom mapping, input device mapper 39 may interpret the user's changes as the expression of a set of preferences. For example, if a user uses the display depicted in FIG. 6 to modify the mapping of joystick 67 into the actions for a game in the first-person genre, input device mapper 39 may interpret the user's choice as a general preference that joystick 67 should work similarly with all games in first-person genres (i.e., that button 602 should enable a cloaking device in any first-person game that offers a cloaking device). The user's preferences may be stored in a file or database for future use by the user. Additionally, storing the preferences in a file or database permits the preferences to be easily ported from computer 20 to any other machine on which input device mapper 39 has been implemented, thus permitting consistent mappings across several machines.

Figure 7:
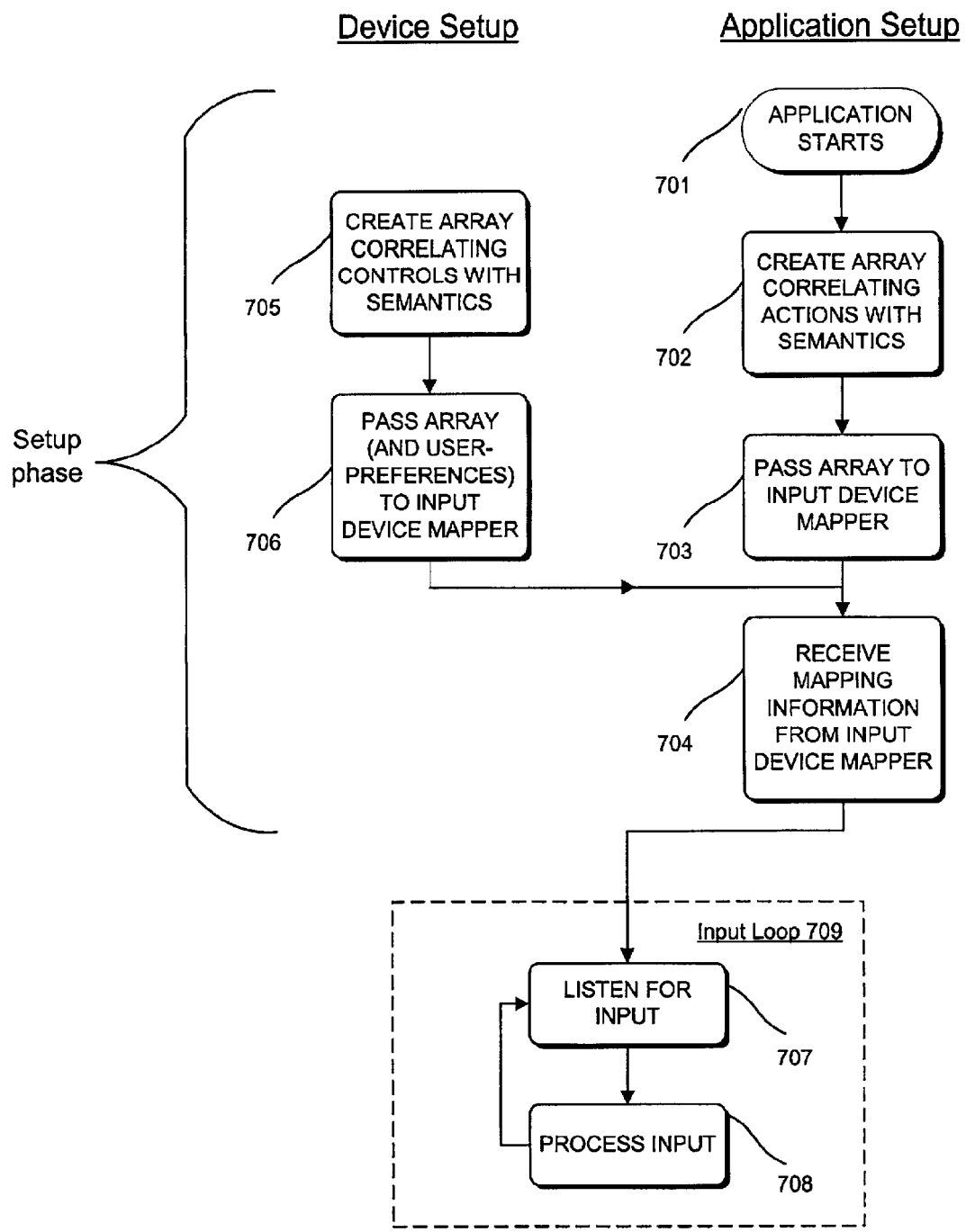
FIG. 7 is a flowchart illustrating a process by which an input device mapper is used.

FIG. 7 is a flowchart showing an example use of an input device mapper, and the steps to initiate its use. As shown in FIG. 6 and described in detail below, a device and an application both undergo a setup phase, in which they pass their respective C-S and A-S correlations to an input device mapper; the application program then receives and processes input in accordance with the mapping.

Steps 701 through 704 relate to the setup of an application program for use with input device mapper 39. An application program, such as driving game application 36*a*, begins execution at step 701. At step 702, the application creates an array correlating actions with semantics. For example, application 36*a* could create an array representing A-S correlation 231. The array created at step 702 is passed to input device mapper 39 at step 703.

One method of representing A-S correlation 231 in the array created as step 702 is to assign a unique value to each action and to each semantic. For example, the semantics in genre 211, which are used in A-S correlation 231 and C-S correlation 221, may be assigned unique values as follows: 1 represents "STEER", 2 represents "ACCELERATE", etc. In a programming environment that supports symbolic constants, such as C++, it is convenient to represent the values as symbols. Input device mapper 39 may define the set of available genres and assign symbolic constants to each semantic, which may be exported to users of input device mapper 39 in a header file. Similarly, unique values may be assigned to each action that application program 36*a* performs, which may also be represented by symbolic constants in an appropriate programming environment. The array created at step 702 then contains a sequence of ordered tuples, where each tuple includes, in a defined order, a value representing an action performed by the application, and a value representing a semantic correlated with that action.

Steps 705 and 706, which relate to the setup of a device for use with an input device mapper, take place asynchronously with respect to steps 701, 702, and 703. For an input device connected to computer 20, an array is created at step 705 correlating the controls on the device with semantics from a particular genre. For example, an array may be created representing C-S correlation 221, which correlates the controls on device 66 with semantics chosen from genre 211. The C-S correlation may be represented in an array in a manner analogous to that used to represent an A-S correlation, as described above: unique values are associated with each control, and an array is constructed to contain a sequence of ordered tuples, where each tuple includes, in a defined order, a value representing a control and a value representing a semantic correlated with the control. When multiple C-S correlations exist for a given device, they may be represented in multiple arrays. The array(s) created at step 705 is (are) passed to input device mapper 39 at step 706. Optionally, any user preferences that have been specified may also be passed to input device mapper 39 in an appropriate format at step 706.

The creation of the array at step 705 may take place long before application 36*a* begins executing, or at any time prior to steps 704 and 706. For example, the supplier of game controller 66 may create C-S correlation 221 at the time game controller 66 is designed, and supply an array representing C-S correlation 221 along with game controller 66 on a medium such as magnetic disk 29 or optical disk 31; this array can then be passed to input device mapper 39 at step 706 by loading it into computer 20 through magnetic drive 28 or optical drive 30. Alternatively, game controller 66 may be known to the designer of input device mapper 39, in which case the array may be built into input device mapper 39.

Figure 8:
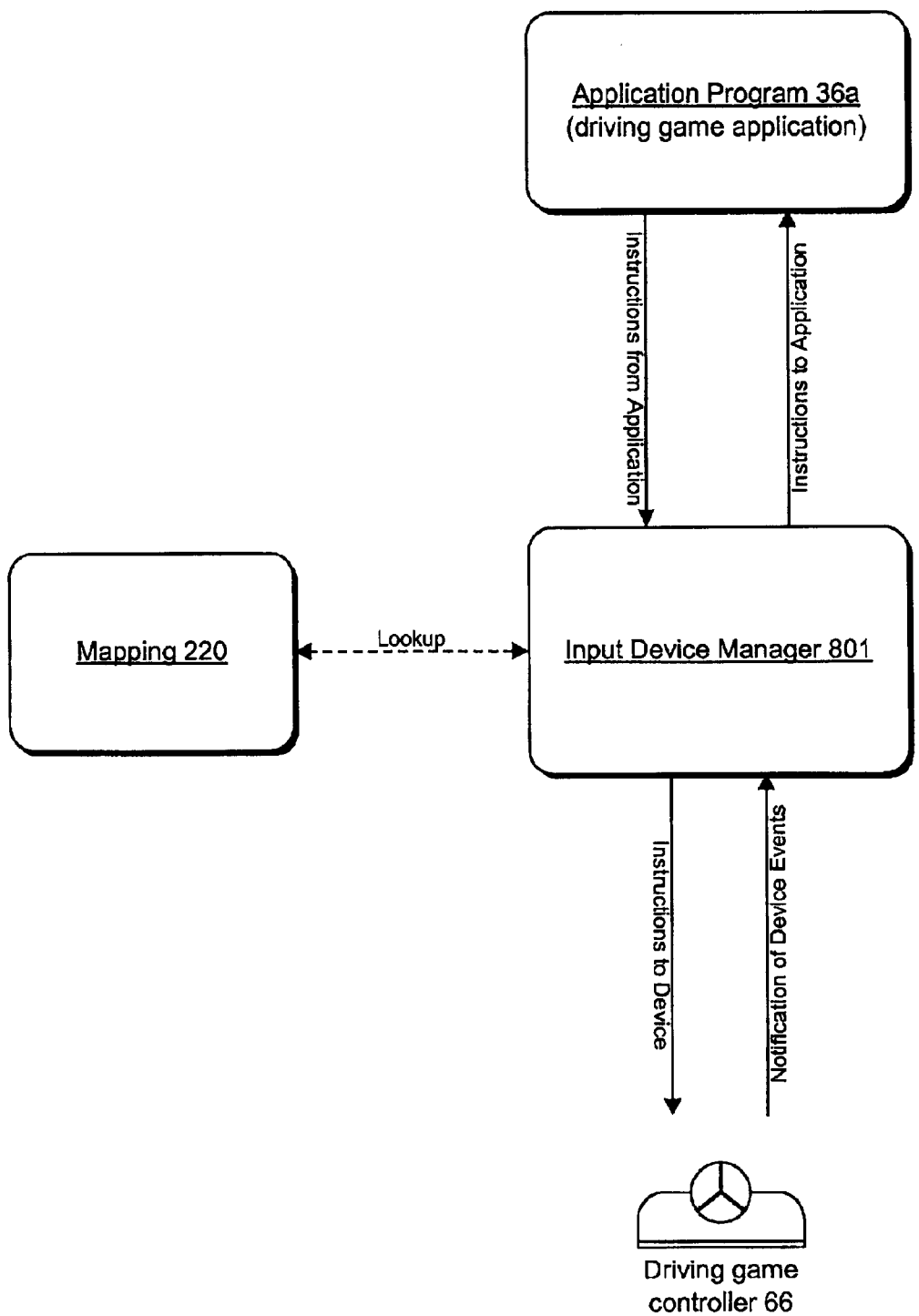
FIG. 8 is a block diagram showing the use of a mapping created by an input device mapping.

Step 704 takes place after steps 703 and 706 have been completed. After input device mapper 39 has received the arrays created at step 702 and the array created at step 705, it creates a mapping, such as mapping 220, by the process described above in the text accompanying FIG. 5. After the mapping has been created, input device mapper 39 may provide mapping information to application program 36*a* at step 704. The mapping information provided may include information about which device control is correlated with each application-defined action. If the mapping is provided to application program 36*a* at step 704, then application program 36*a* can use the mapping to convert notifications of device events into actions that application program 36*a* performs. Alternatively, instead of providing the mapping to application program 36*a*, the mapping may be provided to an input device manager, which is depicted in FIG. 8 and described below, which uses the mapping to translate device event notifications into input for application program 36*a*. In the case where an input device manager is used to translate device event notifications into application program input, it is not necessary to provide the mapping to application program 36*a*, in which case step 704 can be omitted.

Following step 704, application program 36*a* begins its input loop 709, which comprises listening for input at step 707, processing the input at step 708, and returning to step 707 to listen for more input. When the mapping has been provided to application program 36*a* at step 704, application program 36*a* can use the mapping to process the input. In this case, application program would receive notification of events on an input device, such as game controller 66, and would use the mapping to look up what actions to perform in response to a given event. Alternatively, when an input device manager is used, as depicted in FIG. 8 and discussed below, the input device manager translates each device event notification into an instruction to application program 36*a* to perform a particular action. In this case, application program 36a does not perform any lookup into the mapping in processing step 707; it simply follows instructions received from the input device manager.

FIG. 8 shows an input device manager 801, which uses mapping 220 created by input device mapper 39 to provide communication between driving game application 36a and game controller 66. Input device manager 801 operates during execution of an application program, and uses a mapping to translate notification of input device events into commands to the application program. For example, in FIG. 8, input device manager 801 uses mapping 220, which is depicted in FIG. 5, to translate between events on game controller 66 and driving game application 36a. Driving game controller 66 sends input device manager 801 a data item signifying that an event has happened, such as the pressing of the right pedal. Input device manager 801 performs a lookup in mapping 220, and determines that the data received is correlated with the semantic "ACCELERATE," which, in turn, is correlated with the action "speed up." Input device manager 801 then sends into the input stream of driving game application 36a data representing an instruction to perform the "speed up" action.

In addition to providing instructions to driving game application 36a, input device manager 801 may also provide other information including the number of times that a control has been operated, the duration of its operation, a timestamp for the operational event (e.g., button 1 was pressed at time=T1, x-axis was moved to position −32 at time=T2, etc.), or a parameter further describing the device event (e.g., in addition to data signifying that motion along the x-axis has occurred, input device manager 801 may also provide data indicating the magnitude and direction of the motion, or data indicating the resulting position of the control). An application, such as driving game application 36a, may be interested in this information. For example, the firing of a weapon may become more rapid after trigger 1 has been depressed for more than one second. A different game application might cause a pinball cue or a slingshot to be pulled back further the longer a button has been depressed.

Input device manager 801 may receive event notifications from multiple devices, and use the data received from multiple devices to report unified instructions to an application. By doing so, it allows an application to be controlled by various devices while allowing the application to view its input as if it came from a single "unified" device. For example, the auxiliary input used to implement the "change dash display" action correlated with the "DASHBOARD" semantic in driving game 36a could be the "D" key on keyboard 40 (not shown in FIG. 8). Input device manager 801 will receive notification that the "DASHBOARD" semantic has been pressed, and will translate this notification into an instruction to driving game application 36a. The source of the input is transparent to application 36a, which knows only that it has received the instruction to perform the action correlated with the semantic "DASHBOARD." Another possible application of reporting unified instructions from multiple devices is aggregation of devices (e.g., using a joystick 67 with a set of pedals that are physically connected to driving game controller 66). Alternatively, in some circumstances it may be useful for input device manager 801 not to unify the input from multiple devices and to inform application 36a which input device a particular input originated from, for example the case where two joysticks are connected to a computer and used simultaneously for a two-player game. This result can be accomplished by assigning an identifying number to each device and providing a device's identifying number to application 36a along with input generated by that device.

When an application and a device are configured such that the application can instruct the device to perform certain actions, input device manager 801 can also use mapping 220 to convey these instructions from the application to the device. For example, as discussed above, driving game application 36a has a "feedback" instruction, which is mapped to the "vibrate" function on game controller 66 through the semantic "RUMBLE." Input device manager 801 receives the "feedback" instruction from driving game application 36a and uses mapping 220 to send game controller 66 an instruction to vibrate. Game application 36a may provide the instruction to input device manager 801 with a parameter to be communicated to game controller 66, such as the strength with which game controller 66 should vibrate.

A further type of information that might be conveyed to input device manager 801 from an application is the application's context, so that input device manager 801 can change the sense of the controls to match their use in the present phase of the game. For example, driving game 36a may notify input device manager 801 when it has changed from the driving simulation genre to the role-playing genre, so that the use of the controls will be appropriate for the current phase of the game; as another example, a baseball game application may notify the input device manager when it changes from a batting context to a fielding context. Input device manager 801 uses this information to look up the appropriate mapping information for the present context.

EXAMPLES

The following are examples of genres. The semantics in each genre are divided into "priority 1" semantics and "priority 2" semantics, which are described below:

| Semantic | Description |
| --- | --- |
| Genre 1: Combat Driving sim, with weapons | |
| Priority 1 Controls | |
| Steer | left/right |
| Accelerate | faster/slower |
| Brake | Brake |
| Weapons | select next weapon |
| Fire | fires selected weapon |
| Target | selects next available target |
| Menu | pause, show menu of priority 2 & 3 controls |
| Priority 2 Controls | |
| Look | forward/right/backward/left |
| View | cycle through view options |
| Device | show device and controls |
| Dashboard | select next dashboard/heads-up display option |
| Press to talk | for voice communication |
| Up shift | select next higher gear |
| Down shift | select next lower gear Reverse from neutral |
| Genre 2: Flying Sim, without weapons | |
| Priority 1 Controls | |
| Bank | bank ship left/right |
| Climb/dive | pitch up/down |
| Throttle | faster/slower |
| Brake | brake |
| Menu | pause, show menu of priority 2 & 3 controls |
| Priority 2 Controls | |
| Look | forward or up/back or down/left/right |
| Rudder | turn ship left/right |
| View | select next view (in the cockpit, behind plane, etc.) |

-continued

| Semantic | Description |
|---|---|
| Display | select next on-screen display options, maps, etc. |
| Flaps up | |
| Flaps down | |
| Toggle Gear | Gear up/down |
| Press to talk | voice communication |
| Device | displays input device and controls |

Genre 3: Role Playing

Priority 1 Controls

| Semantic | Description |
|---|---|
| Move | forward/back/left/right |
| Get | pick up and carry item |
| Select Inventory | select next inventory item |
| Apply | use selected inventory item |
| Attack | |
| Cast | cast spell |
| Talk | communicate |
| Crouch | crouch, climb down, swim down |
| Jump | jump, climb up, swim up |
| Menu | pause, show menu of priority 2 & 3 controls |

Priority 2 Controls

| Semantic | Description |
|---|---|
| Look | forward or up/back or down/left/right (usually maps to point of view ("POV") on devices that have one) |
| Map | cycle through map options |
| Display | shows next on-screen display options, maps, etc. |
| Press to talk | voice communication (multi-player) |
| Rotate | turn body left/right |
| Device | displays input device and controls |

Genre 4: Hunting

Priority 1 Controls

| Semantic | Description |
|---|---|
| Move | move forward/backward/left/right - or - aim up/down/left/right |
| Aim | toggle "Move" axis above between aim and move |
| Fire | fire selected weapon |
| Weapon | select next weapon (cycle through options) |
| Binoculars | look through binoculars |
| Call | make animal call |
| Map | view map |
| Special | do game special operation (rattle, eat) |
| Menu | pause, show menu of priority 2 & 3 controls |

Priority 2 Controls

| Semantic | Description |
|---|---|
| Look | forward or up/back or down/left/right usually maps to POV on devices that have one |
| Display | shows next on-screen display options, maps, etc. |
| Press to talk | voice communication (multi-player) |
| Rotate | turn body left/right |
| Crouch | crouch, climb down, swim down |
| Jump | jump, climb up, swim up |
| Device | displays input device and controls |

Genre 5: Real Time Strategy

Priority 1 Controls

| Semantic | Description |
|---|---|
| Scroll | up/down/left/right |
| Select | Select unit/object/item |
| Instruct | cycle through instructions |
| Apply | apply selected instruction |
| Team | select next team (cycle through all) |
| Building | select next building |
| Menu | pause, show menu of priority 2 & 3 controls |

Priority 2 Controls

| Semantic | Description |
|---|---|
| Map | cycle through map options |

-continued

| Semantic | Description |
|---|---|
| Display | shows next on-screen display options, maps, etc. |
| Press to talk | voice communication (multi-player) |
| Device | displays input device and controls |

Genre 6: Baseball

Priority 1 Controls - batting

| Semantic | Description |
|---|---|
| Aim | aim where to hit |
| Select | cycle through swing options |
| Normal | normal swing |
| Power | swing for the fence |
| Bunt | bunt |
| Steal | have base runner attempt to steal a base |
| Burst | have base runner invoke burst of speed |
| Slide | have base runner slide into base |
| Box | Enter or exit batting box |
| Menu | pause, show menu of priority 2 & 3 controls |

Priority 2 Controls - batting (none)

Priority 1 Controls - pitching

| Semantic | Description |
|---|---|
| Aim | aim where to pitch |
| Select | cycle through pitch selections |
| Pitch In | throw pitch into strike zone |
| Pitch Out | throw pitch outside of strike zone |
| Base | select base to throw to |
| Throw | throw to base |
| Catch | catch hit ball |
| Menu | pause, show menu of priority 2 & 3 controls |

Priority 1 Controls - fielding

| Semantic | Description |
|---|---|
| Aim | aim where to run or throw |
| Nearest | switch to fielder nearest to the ball |
| Conservative Throw | make conservative throw |
| Aggressive Throw | make aggressive throw |
| Burst | invoke burst of speed |
| Jump | jump to catch ball |
| Dive | dive to catch ball |
| Menu | pause, show menu of priority 2 & 3 controls |

Priority 2 Controls - fielding (none)

Genre 7: 2D side to side movement

Priority 1 Controls

| Semantic | Description |
|---|---|
| Move | left/right/jump or climb or swim up/down |
| Throw | throw object |
| Carry | carry object |
| Attack | attack |
| Special | apply special move |
| Select | select special move |
| Menu | pause, show menu of priority 2 & 3 controls |

Priority 2 Controls

| Semantic | Description |
|---|---|
| View | scroll view left/right/up/down usually maps to POV on devices that have one |
| Device | displays input device and controls |

Genre 8: 2D Object Control (CAD)

Priority 1 Controls

| Semantic | Description |
|---|---|
| Move | move object or scroll view up/down/left/right |
| View | select between move and scroll |
| Zoom | in/out |
| Select | |
| Special 1 | do first special operation |
| Special 2 | do second special operation |

-continued

| Semantic | Description |
| --- | --- |
| Special 3 | do third special operation |
| Special 4 | do fourth special operation |
| Menu | pause, show menu of priority 2 & 3 controls |
| Priority 2 Controls | |
| Rotate Z | rotate object or view clockwise/ counterclockwise |
| Display | shows next on-screen display options, etc. |
| Device | displays input device and controls |
| Genre 9: Browser Control | |
| Priority 1 Controls | |
| Pointer | Move on screen pointer |
| Select | Select current item |
| Forward/Back | Move between items already seen |
| Page Up/Down | Move view up/down |
| Search | Use search tool |
| Refresh | Refresh |
| Stop | Cease current update |
| Priority 2 Controls | |
| Home | Go directly to "home" location |
| Favorites | Mark current site as favorite |
| Next | Select Next page |
| Previous | Select Previous page |
| History | Show/Hide History |
| Print | Print current page |

HID Implementation

Figure 9:
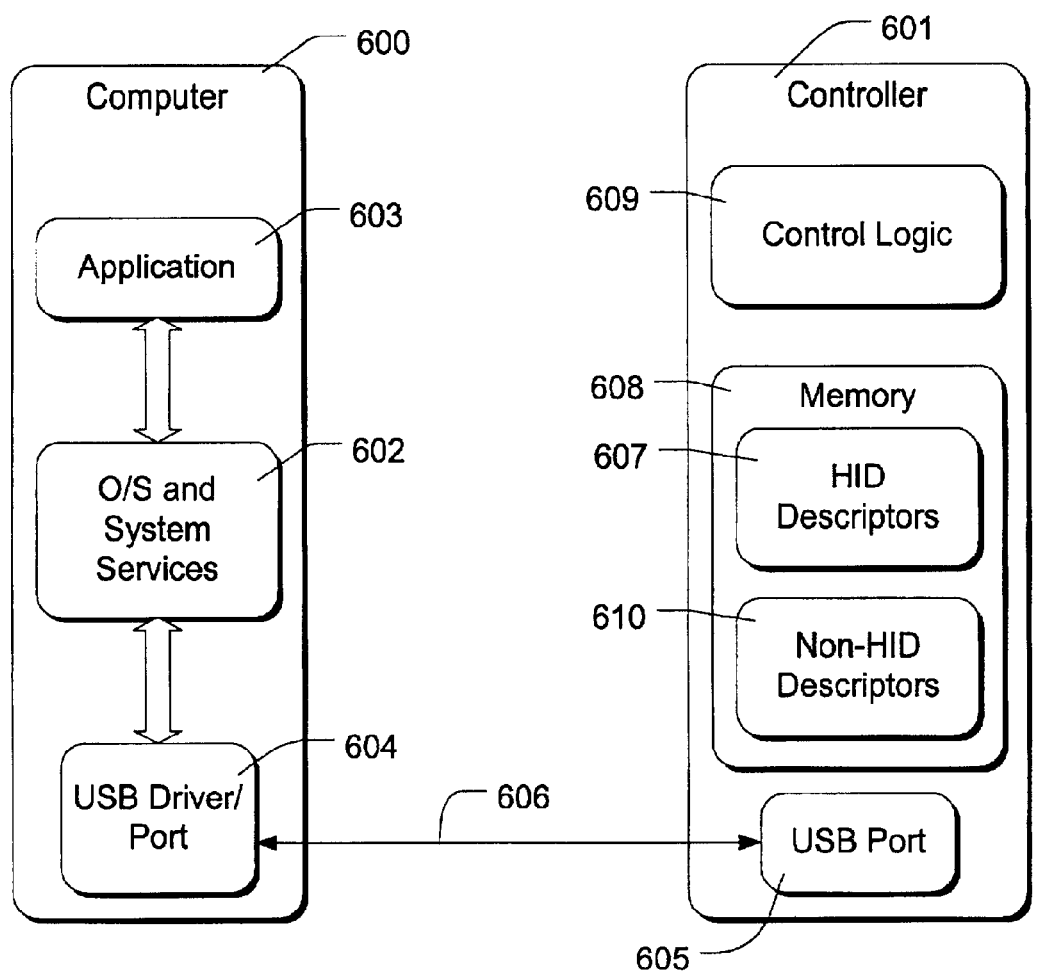
FIG. 9 is a block diagram of an exemplary computer and game control device.

FIG. 9 shows an implementation of a computer and/or game system that is compatible with the Universal Serial Bus (USB) and Human Device Interface (HID) specifications. Both of these specifications are available from USB Implementers Forum, which has current administrative headquarters in Portland, Oregon (current Internet URL: www.usb.org).

The system of FIG. 9 includes a computer 600 and a computer peripheral, game control device 601. The computer is a conventional desktop PC or other type of computer. Computer 600 runs an operating system 602 such as the MICROSOFT WINDOWS family of operating systems. The operating system provides various system services to one or more application programs 603 running on computer 600. Computer 600 also has a USB communications driver and port 604.

Control device 601 is one of any number of different types of controllers, such as a joystick, keypad, etc. It has a plurality of human-actuated controls such as buttons, sliders, and other well-known input and/or output controls. A physical example of such a controller is shown in FIG. 6.

The control device has a USB port 605 and communicates with computer 600 via a USB communications medium 606. In addition, control device 601 is configured to store various HID data 607 such as various device class descriptors defined by the HID standard. The HID descriptors enumerate and describe aspects of the control device's controls, and are formatted as specified by the HID standard. The control device has non-volatile memory 608 in which the HID data is stored. HID data can be requested and obtained by computer 600 through the USB communications cable.

Control device 601 also has control logic 609 (usually in the form of a microprocessor and associated support components) that is responsible for detecting control actuation and for communicating with computer 600.

The HID standard provides for so-called "string indexes", which can be associated in HID descriptors with different usages and controls. A string index is a numeric value, normally used to reference actual strings associated with the HID descriptors. In the described implementation, HID control device 601 includes a unique HID string index for each control of the control device—each control is associated with a different string index. The string indexes are defined within conventional HID descriptors or data structures. In accordance with the HID standards, computer 600 is able to request and receive these descriptors from the HID control device.

Although HID string indexes are normally a single byte, the described implementation uses larger values. This is possible because these string indexes are not being used to refer to actual HID strings. Rather, they are used to correlate with similar string indexes used in the non-HID data described below.

The string indexes are used by computer 600 to uniquely identify the various controls of the HID control device. In the described embodiments, each control is assigned a numeric string index.

Although HID provides for string indexes, it does not provide any way to represent genre mapping data. For this purpose, the non-volatile memory of HID control device 601 contains a non-HID data description or descriptor 610 which in turn contains various non-HID data as will be described in more detail below. Generally, descriptor 610 contains control mappings, for a plurality of different application program genres, of controls to actions. Within the non-HID data structures, the controls are referenced by their HID string indexes. This allows subsequent correlation of the HID data with the non-HID data.

Prior to using a HID control device in this implementation, a computer application program on computer 600 retrieves both the HID descriptors 607 and the non-HID descriptor 610 from control device 601. Within the non-HID descriptor, the computer locates data corresponding to a particular genre, and extracts the appropriate control mappings from the non-HID descriptor. Each control mapping indicates a control (referenced by its HID string index) and an associated action. The computer then uses the specified string indexes to correlate the control mappings to the actual controls specified by the HID descriptor.

The described technique relies on a predefined definition of genres, as described in the previous section of this document. Within the non-HID data structures discussed below, the various genres and the actions defined within the genres are identified by different constants such as predefined numeric identifiers.

Figure 10:
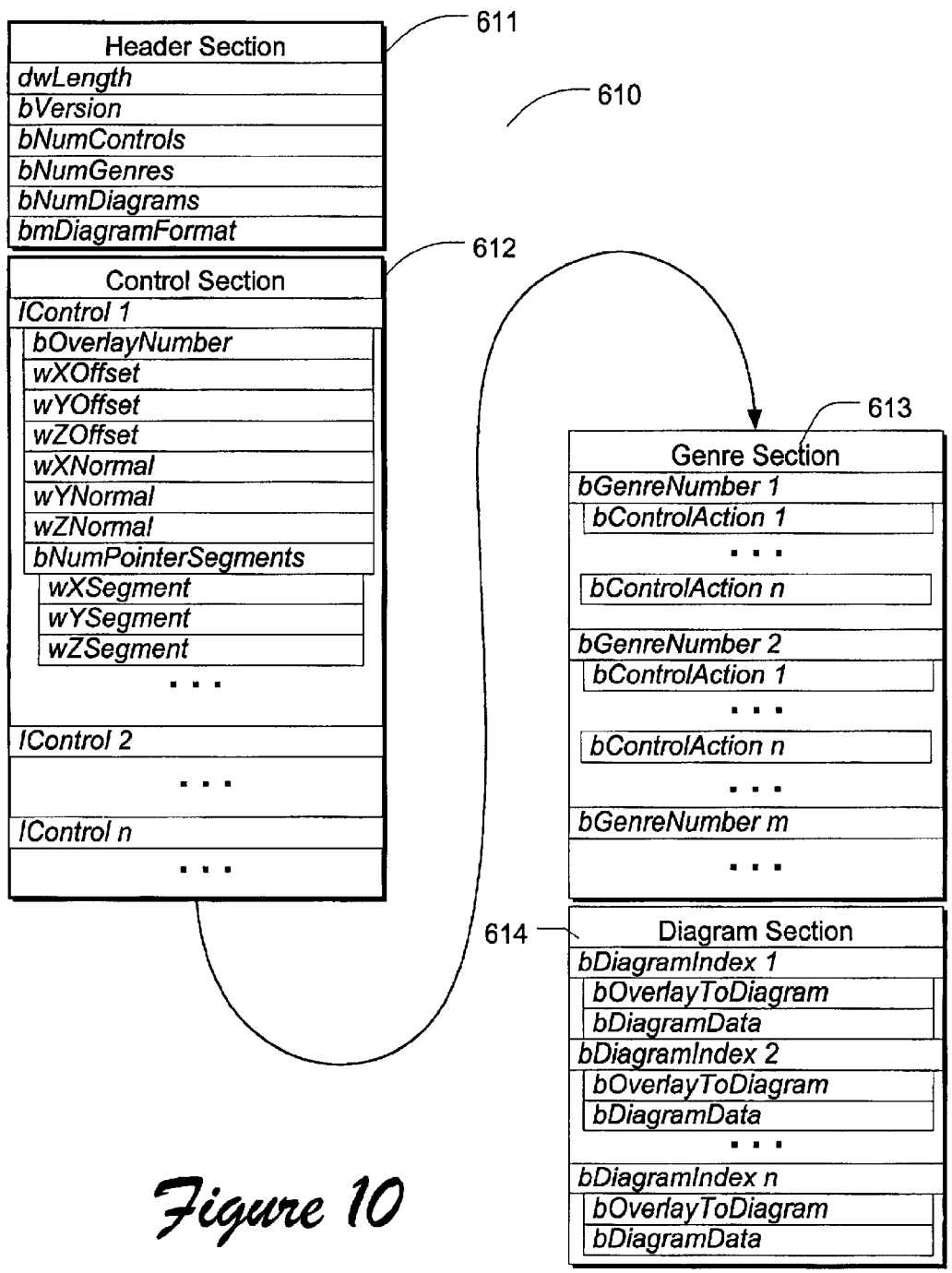
FIG. 10 is a block diagram of a non-HID data descriptor.

This is illustrated more clearly in FIG. 10, which show the structure and content of a non-HID genre descriptor 610 in accordance with the described embodiment. Descriptor 610 includes four major sections: a header section 611, a control section 612, a genre section 613, and a diagram section 614.

Header section 611 contains the following fields:

§ dwLength—the total length of the genre descriptor;

§ bVersion—the version number of the genre descriptor;

§ bNumControls—the total number of controls present on the control device;

§ bNumGenres—the total number of genre supported by the control device, in order of manufacturer's preference;

§ bNumDiagrams—the total number of graphics diagrams included in the genre descriptor (graphics diagrams and their uses will be explained below);

§ bmDiagramFormat—the format in which the graphics diagrams are stored.

The bNumDiagrams and bmDiagramFormat fields refer to graphics overlays that are contained in the non-HID genre descriptor for use by computer 600 and any application programs that use the peripheral control device 601. At least one of these diagrams is an illustration of the control device itself, including representations of it various controls and their locations. The genre descriptor preferably includes a plurality of such diagrams, illustrating the control device from different angles.

In addition to diagrams of the overall control device, the graphics diagrams can include overlay images that illustrate details of individual controls. These images might, for example, be enlargement or blow-ups of respective control.

The genre descriptor also includes information that allows an information program to construct multi-segment lead lines or arrows from a text identifier to a corresponding control. Using this information, the application program can construct an image that specifically describes the actual functions performed in the application program by the various controls.

Information regarding graphics images and lead lines is contained in the control and diagram sections.

Control section 612 enumerates a control data structure for every control of the device. Each such data structure contains the following fields:

- ξ wControl—the HID string index of a control. Each enumeration of the control data structure refers to a different control, and therefore sets forth a different HID string index. This string index corresponds to the HID string index as found in the HID descriptors.
- ξ bOverlayNumber—identifies the overlay associated with the control, with reference to the bDiagramIndex field of the diagram section (see below).
- ξ wXOffset—the location in the X dimension of the control in the indicated overlay (bOverlayNumber) from the top left of the overlay.
- ξ wYOffset—the location in the Y dimension of the control in the indicated overlay (bOverlayNumber) from the top left of the overlay.
- ξ wZOffset—the location in the Z dimension of the control in the indicated overlay (bOverlayNumber) from the top left of the overlay. Used only in 3-dimensional diagrams.
- ξ wXNormal—indicates information regarding the Normal in the X direction. The three normal coordinates (see immediately below) specify a 3-dimensional vector which is used to orient pointers or lead lines when showing different rotations of the device.
- ξ wYNormal—indicates information regarding the Normal in the Y direction.
- ξ wZNormal—indicates information regarding the Normal in the Z direction.
- ξ bNumPointerSegments—the number of segments in the lead line corresponding to the control. The following wXSegment, wYSegment, and wZSegment fields are repeated for each indicated segment (up to a limit of four).
- ξ wXSegment—X coordinate of the base of an arrow segment.
- ξ wYSegment—Y coordinate of the base of an arrow segment.
- ξ wZSegment—Z coordinate of the base of an arrow segment (for 3-dimensional diagrams).

In this example, these fields are repeated for every one or n controls.

Genre Section 612, in conjunction with the string indexes of control section 611, form the control mappings that are used by computer 600 to correlate genre actions with actual control device controls. The control mappings indicate actions to be performed in application programs of particular genres in response to respective ones of the human-actuated controls of the game control device.

This section has a set of entries for a plurality of different application program genres. In this example, there are m genres. Within each genre the desired actions of each control are listed, in the same order as the controls are enumerated in the control section. Thus, the size of the genre section depends on the number of supported genres and the number of controls. The genre fields are as follows:

- ξ bGenreNumber—a number or code indicating the genre to which the subsequently enumerated actions belong.
- ξ bControlAction—the action that is to be performed in response to a particular control. Following each bGenreNumber, the bControlUsage field is repeated to enumerate the actions of every control listed in control section 612, in the same order as the controls are listed in section 612.

Diagram section 613 contains any diagrams that have been provided for the control device. The following fields are repeated in the diagram section for every diagram:

- ξ bDiagramIndex—an index number corresponding to the diagram.
- ξ bOverlayToDiagram—if this diagram is an overlay, contains the bDiagramIndex of the underlying diagram. If this diagram is not an overlay, the bOverlayToDiagram field is set to zero.
- ξ bDiagramData—the actual diagram data structure (.bmp, .jpg, .gif, etc.)

Figure 11:
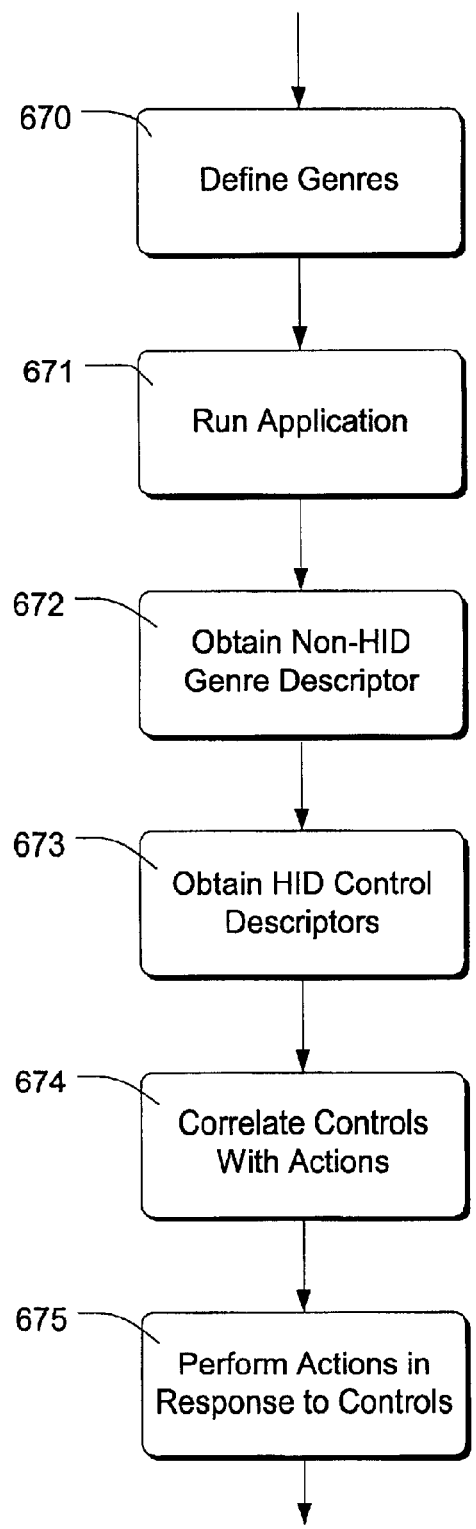
FIG. 11 is a flowchart showing methodological aspects of the described embodiment.

FIG. 11 shows methodological aspects of this embodiment. Methodological features include an act 670 of defining a plurality of application program genres. Each such genre includes potential actions to be performed in an application program of that genre.

Act 671 comprises running an application program that has been classified as a particular genre. The application program is responsive to a plurality of human-actuated controls on a peripheral control device such as control device 601.

An act 672 comprises querying the control device to obtain a non-HID genre descriptor of the type shown in FIG. 10. Generally, the genre descriptor indicates actions to be performed by an application program of a particular genre in response to respective controls of the control device. As discussed above, the genre descriptor references controls by there HID string indexes.

Act 673 comprises retrieving one or more HID descriptors from the control device to determine various details regarding the controls and also to determine their string indexes.

Act 674 comprises correlating the controls with actions as specified by the non-HID descriptor. Act 675 comprises responding to the controls by performing the correlated actions in the application program.

In the system shown in FIG. 11, these steps are performed in conjunction with system services that are independent of the application program, such as part of the operating system. FIG. 9 illustrates this architecture. In the future, for example, such system services might be integrated in the "DirectX"® software component provided by Microsoft corporation for use with its WINDOWS family of operating systems.

When such system services are provided, the application program itself does not have to interact directly with the peripheral devices. Rather, the system services accept queries from the application program, and in turn take care of the low-level details of communicating with USB peripheral such as this. Specifically, the application program requests the system services to obtain control mappings for a specified genre. The system services retrieve the required information (including HID and non-HID data) from the peripheral, parse the data, and return only the requested information to the application program.

Note that the system services might be designed to obtain information from locations other than the device itself. For example, the user could optionally specify that the requested information is found on a CD or at a specified file location. The data could conceivably be in different formats that those illustrated above.

USB Details

USB devices use request codes to define "device requests" from a host computer to a peripheral device. A device request is a data structure that is conveyed in a "control transfer" from the host to the peripheral device. A control transfer contains the following fields:

- bmRequestType—a mask field indicating (a) the direction of data transfer in a subsequent phase of the control transfer; (b) a request type (standard, class, vendor, or reserved); and (c) a recipient (device, interface, endpoint, or other). The primary types of requests specified in the "request type" field are the "standard" and "vendor" types, which will be discussed below.
- bRequest—a request code indicating one of a plurality of different commands to which the device is responsive.
- wValue—a field that varies according to the request specified by bRequest.
- wIndex—a field that varies according to request; typically used to pass an index or offset as part of the specified request.
- wLength—number of bytes to transfer if there is a subsequent data stage.

All USB devices are supposed to support and respond to "standard" requests—referred to herein as "USB-specific" requests. In a USB-specific request, the request type portion of the bmRequestType field contains a predefined value indicative of the "standard" request type.

Each different USB-specific request has a pre-assigned USB-specific request code, defined in the USB specification. This is the value used in the bRequest field of the device request, to differentiate between different USB-specific requests. For each USB-specific request code, the USB specification sets forth the meanings of wValue and wIndex, as well as the format of any returned data.

USB devices can optionally support "vendor" requests—referred to herein as "device-specific" requests. In a device-specific request, the request type portion of the bmRequestType field contains a predefined value indicate of the "vendor" request type.

In the case of device-specific requests, the USB specification does not assign request codes, define the meanings of wValue and wIndex, or define the format of returned data. Rather, each device has nearly complete control over the meaning, functionality, and data format of device-specific requests. Specifically, the device can define its own requests and assign device-specified request codes to them. This allows devices to implement their own device requests for use by host computers. However, there is no USB provision that would allow a host or operating system to define request codes.

Figure 12:
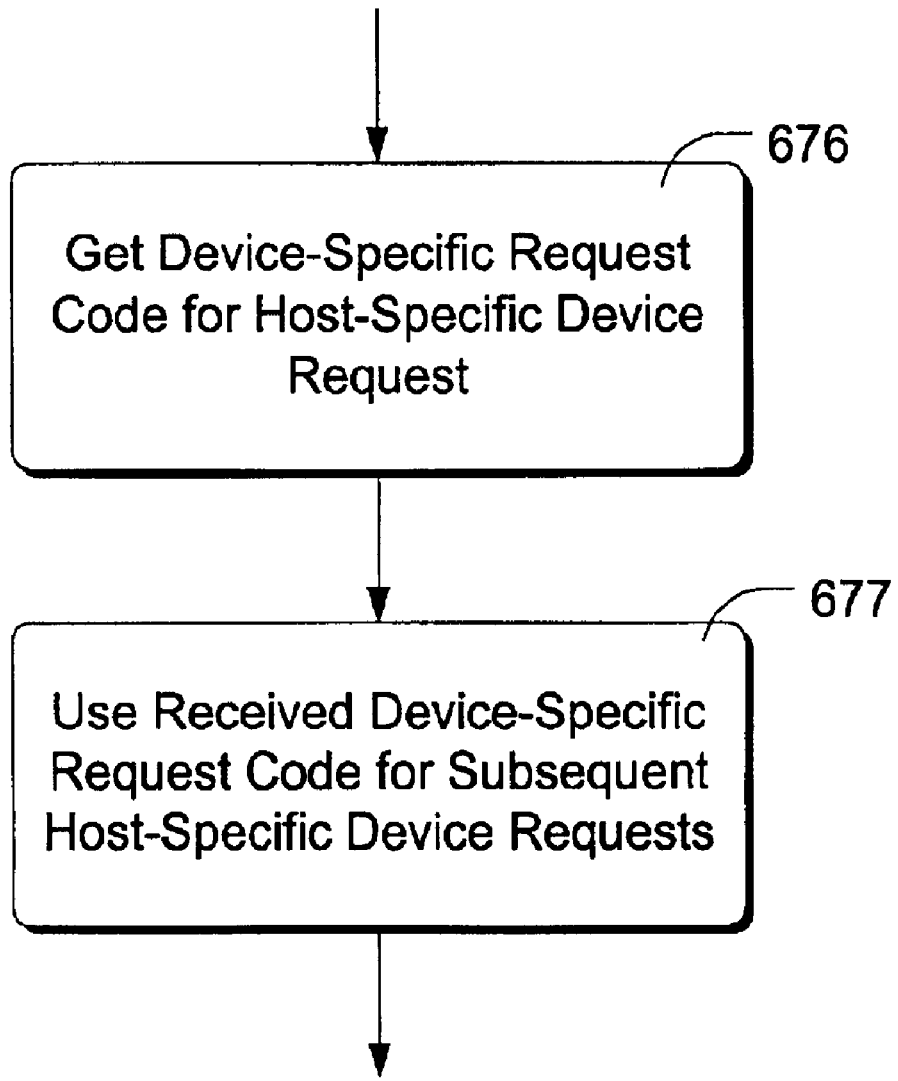
FIGS. 12 and 13 are flowcharts showing methodological aspects of a USB implementation.

FIG. 12 shows top-level methodological aspects of the described USB system. Generally, a new, non-USB-specific device request is defined for use with various USB peripherals. This request is referred to herein as a host-specific device request. Because of the described methodology, the host-specific device request can be defined by the manufacturer of an operating system or application program, and can then be made available to peripheral vendors so that they can support and respond to the newly defined request. As an example, an OS manufacturer might define a new descriptor allowing peripherals to enumerate actions to be performed by various controls when operating with application programs of different genres. This would allow the operating system to use a single device request to obtain this information from various different peripherals (assuming those peripherals are configured to support the new device request).

In an initialization phase 676, the host sends a request to the peripheral in the form of a USB-specified device request. The request is for a device-specific request code—of the device's choosing—that will be subsequently be used as the request code for the host-specific device request.

Once this request code is obtained, it is used in a subsequent phase 677 to initiate the host-specified device request. Specifically, the host specifies the request code as the bRequest value in a control transfer (see the "Background" section for details regarding a control transfer). The actual protocol of this device request (meanings of bIndex, bValue, etc.) is as specified in the definition of the host-specific device request. Phase 677 is repeated as desired during subsequent operation, without repetition of initialization phase 100.

Figure 13:
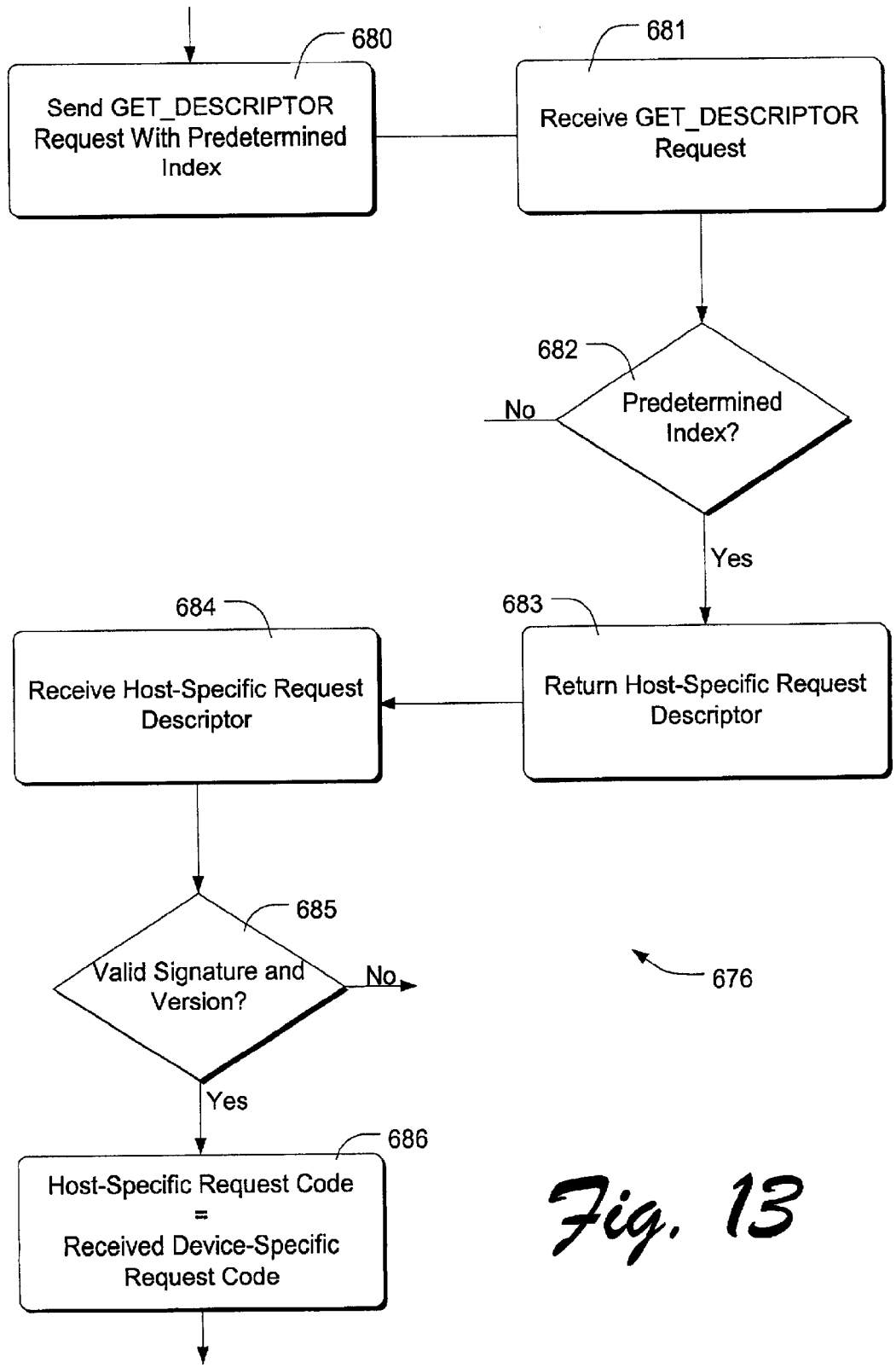

FIG. 13 shows more details regarding the initialization phase 676. Actions performed by the host are on the left, and actions performed by the device are on the right.

The host performs an action 680 of sending a GET_DESCRIPTOR device request to the peripheral device. The GET_DESCRIPTOR device request is a standard, USB-specific request, identified in a control transfer by the GET_DESCRIPTOR request code (bRequest=GET_DESCRIPTOR). The fields of the control transfer (discussed above in the background section) have values as follows:

- bmRequestType=10000000 (binary), indicating a "device-to-host" transfer, a "standard" or "USB-specific" type request, and a device recipient.
- bRequest=GET_DESCRIPTOR. This is a constant (six) defined by the USB specification
- wValue=03EE (hex). The high byte (03) indicates that the request is for a "string" descriptor, and the low byte is an index value that is predefined as a constant in the definition of the host-specified device request. In this example, it has been defined as EE (hex), but could be predefined as any other value.
- wIndex=0.
- wLength=12 (hex). This is the length of a host-specific request descriptor that will be returned in response to this request. In the described example, the length is 12 (hex).
- data—returned request descriptor.

A compatible USB device is configured to respond to a request such as this (where wValue=03EE (hex)) by returning a host-specific request descriptor. This descriptor is not defined by the USB standard, but has fields as defined in the following discussion. The host-specific request descriptor designates a device-specific request code that will work on this device to initiate the host-specific request code. In other words, the manufacturer of the device can select any device-specific request code, and associate it with an implementation of the host-specific device request.

More specifically, the device receives the GET_DESCRIPTOR device request (block 681 of FIG. 13) and performs a decision 682 regarding whether the index value (the second byte of wValue) corresponds to the predetermined value (EE (hex)). This predetermined value is a value that is chosen to be used specifically for this purpose.

If the index value does not correspond to the predetermined value, the device responds in an appropriate way, usually by returning some other descriptor that corresponds to the index value. If the index value does correspond to the predetermined value, an action 683 is performed of returning the host-specific request descriptor to the host.

The host-specific request descriptor contains the following fields:

ξ bLength—the length of the descriptor (12 (hex) in this example).

ξ bDescriptorType—the type of descriptor (string type in this example).

ξ qwSignature—a signature confirming that this descriptor is indeed a descriptor of the type requested. The signature optionally incorporates a version number. For example, in the described example MSFT1OO indicates that this descriptor is for an "MSFT" host-specific device request, version "100" or 1.00.

ξ bVendorCode—the device-specific request code that is to be associated with the host-specified device request.

ξ bPad—a pad field of one byte.

The host receives the host-specific request descriptor (block 684) and then performs an action 685 of checking or verifying the signature and version number found in the qwSignature field. The correct signature confirms that the device is configured to support host-specific request codes. If either the signature or version number are incorrect, the host assumes that the device does not support host-specific request codes, and no further attempts are made to use this feature.

The signature field of the host-specific request descriptor block is what provides backward compatibility. A non-compatible device (one that doesn't support host-specific request codes) might use the predetermined wValue 03EE (hex) to store some other type of descriptor, which will be returned to the host without any indication of problems. However, this will become apparent to the host after it examines the data in the location where the signature is supposed to be. If the signature is not found, the host knows that the returned descriptor is not of the type requested, and will assume that the device does not support host-specific request codes.

If the signature and version are confirmed in block 685, the host reads the device-specific request code from the bVendorCode field, and uses it in the future as a host-specific request code (block 686), to initiate the host-specific device request. When using the device, the host sends the host-specific device request by specifying the obtained device-specific request code as part of a control transfer. The device responds by performing one or more predefined actions or functions that correspond to the host-specific device request, in accordance with the specification of the host-specific device request.

The host-specific device request itself is in the format of a normal USB control transfer, including the fields discussed in the "Background" section above. The bRequest field is set to the value of the bVendorCode field of the host-specific request descriptor, which was earlier obtained from the peripheral device. The bmRequestType field is set to 11000001 (binary), indicating a device-to-host data transfer, a "vendor" or device-specific request type, and a device recipient.

The wValue and wIndex fields are used as defined by the definition of the host-specific device request. The wLength field indicates the number of bytes to transfer if there is a subsequent data transfer phase in the device request.

In a current implementation of this system, the host-specific device request is used to request one of a plurality of available host-defined string descriptors from the device. The wIndex field of the host-specific device request indicates which of the plurality of strings are to be returned. The device returns the descriptor referred to by wIndex.

Conclusion

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. A game control device that conforms to Universal Serial Bus (USB) device class definitions for Human Interface Devices (HIDs), comprising:

a plurality of human-actuated controls;

one or more HID descriptors that describe aspects of the human-actuated controls, the HID descriptors associating HID string indexes with the respective human-actuated controls;

control mappings corresponding to a plurality of application program genres, the control mappings indicating actions to be performed in application programs of particular genres in response to respective ones of the human-actuated controls, wherein the control mappings identify controls by their HID string indexes, each of said genres comprising a set of semantics and not including commands interpretable by the application programs.

2. A game control device as recited in claim 1, the control mappings being indicated in data sets comprising:

a control section indicating the HID string indexes for the respective controls;

a genre section indicating actions to be performed in application programs of particular genres in response to respective ones of the human-actuated controls.

3. A computer peripheral comprising:

a plurality of human-actuated controls;

non-volatile memory containing control mappings corresponding to a plurality of application program genres, the control mappings indicating actions to be performed in application programs of particular genres in response to respective ones of the human-actuated controls, each of said genres comprising a set of semantics and not including commands interpretable by the application programs.

4. A computer peripheral as recited in claim 3, wherein the computer peripheral is a USB device and contains device class descriptions of the human-actuated controls in a format specified by the USB device class definition for human interface devices (HIDs), the control mappings containing references to HID identifiers for the respective human-actuated controls.

5. A computer peripheral as recited in claim 3, wherein the computer peripheral is a USB device and contains descriptions of the human-actuated controls in a USB-specified format, the control mappings containing references to control identifiers contained in said descriptions.

6. A computer peripheral as recited in claim 3, wherein the computer peripheral is a USB device and contains device class descriptions of the human-actuated controls in a format specified by the USB device class definition for human interface devices (HIDs), said device class definitions defining different HID string indexes for the respective human-actuated controls, the control mappings identifying controls by their different HID string indexes.

7. A computer peripheral as recited in claim 3, the non-volatile memory containing a descriptor comprising:
 a control section indicating string indexes for the respective controls;
 a genre section indicating the control mappings for the respective application program genres.

8. A computer peripheral as recited in claim 3, the non-volatile memory containing a descriptor comprising:
 a control section indicating string indexes for the respective controls, the string indexes corresponding to separately defined human device interface (HID) string indexes;
 a genre section indicating the control mappings for the respective application program genres, the control mappings identifying controls by their HID string indexes.

9. A computer peripheral as recited in claim 3, the non-volatile memory containing a descriptor comprising:
 a header section indicating the number of controls on the computer peripheral and the number of genres for which control mappings exist in the non-volatile memory;
 a control section indicating string indexes for the respective controls;
 a genre section indicating the control mappings for the respective application program genres;
 a diagram section containing one more graphics images of the computer peripheral, the one or more graphics images identifying locations of the human-actuated controls on the computer peripheral.

10. A computer peripheral as recited in claim 3, the non-volatile memory also containing control data that indicates:
 string indexes for the respective controls;
 graphics overlays that identify the human-actuated controls on the computer peripheral;
 coordinates of the graphics overlays.

11. A computer peripheral as recited in claim 3, the non-volatile memory also containing control data that indicates:
 string indexes for the respective controls;
 graphics overlays that identify the human-actuated controls on the computer peripheral;
 coordinates of the graphics overlays;
 coordinates for pointers to the human-actuated controls.

12. A computer peripheral as recited in claim 3, the non-volatile memory containing a descriptor comprising:
 a header section indicating the number of controls on the computer peripheral and the number of genres for which control mappings exist in the non-volatile memory;
 a control section indicating string indexes for the respective controls, the control section also indicating graphics overlays that identify the human-actuated controls on the computer peripheral;
 a genre section indicating the control mappings for the respective application program genres.

13. A computer peripheral as recited in claim 3, the non-volatile memory further containing one more graphics images that identify the locations of the human-actuated controls on the computer peripheral.

14. A method comprising:
 defining a plurality of application program genres, each of said genres comprising a set of semantics and not including commands interpretable by application programs classifiable in the genre;
 running an application program that has been classified as a particular application program genre, wherein the application program is responsive to a plurality of human-actuated controls on a control device;
 querying the control device to obtain a genre descriptor, the genre descriptor indicating actions to be performed by an application program of said particular application program genre in response to respective ones of the human-actuated controls.

15. A method as recited in claim 14, wherein the obtained genre descriptor comprises:
 a control section indicating string indexes for the respective controls;
 a genre section indicating the control mappings for the respective application program genres.

16. A method as recited in claim 14, further comprising:
 retrieving one or more HID descriptors from the control device, the HID descriptors describing aspects of the human-actuated controls, the HID descriptors associating HID string indexes with the respective human-actuated controls;
 wherein the obtained genre descriptor identifies the human-actuated controls by their HID string indexes.

17. A method as recited in claim 14, wherein the obtained genre descriptor comprises:
 a control section indicating string indexes for the respective controls, the string indexes corresponding to separately defined human device interface (HID) string indexes;
 a genre section indicating the control mappings for the respective application program genres, the control mappings identifying controls by their HID string indexes.

18. A method as recited in claim 14, wherein the obtained genre descriptor comprises:
 a header section indicating the number of controls on the control device and the number of genres for which control mappings exist in the genre descriptor;
 a control section indicating string indexes for the respective controls;
 a genre section indicating the control mappings for the respective application program genres;
 a diagram section containing one more graphics images of the control device, the one or more graphics images identifying locations of the human-actuated controls on the control device.

19. A method as recited in claim 14, wherein the obtained genre descriptor comprises:
 string indexes for the respective controls;
 graphics overlays that identify the human-actuated controls on the control device;
 coordinates of the graphics overlays.

20. A method as recited in claim 14, wherein the obtained genre descriptor comprises:
  string indexes for the respective controls;
  graphics overlays that identify the human-actuated controls on the control device;
  coordinates of the graphics overlays;
  coordinates for pointers to the human-actuated controls.

21. A method as recited in claim 14, wherein the obtained genre descriptor comprises:
  a header section indicating the number of controls on the control device and the number of genres for which control mappings exist in the non-volatile memory;
  a control section indicating string indexes for the respective controls, the control section also indicating graphics overlays that identify the human-actuated controls on the control device;
  a genre section indicating the control mappings for the respective application program genres.

22. A method as recited in claim 14, wherein the obtained genre descriptor comprises one more graphics images that identify the locations of the human-actuated controls on the control device.

23. A computer-readable storage medium containing system services utilized by an application program to interact with a control device having a plurality of human-actuated controls, wherein the system services perform acts comprising:
  receiving a request from an application program for a genre description corresponding to one of a plurality of application program genres, each of said genres comprising a set of semantics and not including commands interpretable by application programs classifiable in the genre;
  querying the control device to obtain a genre descriptor, the genre descriptor indicating actions to be performed by an application program of said one of a plurality of application program genres in response to respective ones of the human-actuated controls;
  returning the obtained genre descriptor to the requesting application program.

24. A computer-readable storage medium as recited in claim 23, wherein the obtained genre descriptor comprises:
  a control section indicating string indexes for the respective controls;
  a genre section indicating the control mappings for the respective application program genres.

25. A computer-readable storage medium as recited in claim 23, the systems services performs a further act comprising:
  retrieving one or more HID descriptors from the control device, the HID descriptors describing aspects of the human-actuated controls, the HID descriptors associating HID string indexes with the respective human-actuated controls;
  wherein the obtained genre descriptor identifies the human-actuated controls by their HID string indexes.

26. A computer-readable storage medium as recited in claim 23, wherein the obtained genre descriptor comprises:
  a control section indicating string indexes for the respective controls, the string indexes corresponding to separately defined human device interface (HID) string indexes;
  a genre section indicating the control mappings for the respective application program genres, the control mappings identifying controls by their HID string indexes.

27. A computer-readable storage medium as recited in claim 23, wherein the obtained genre descriptor comprises:
  a header section indicating the number of controls on the control device and the number of genres for which control mappings exist in the genre descriptor;
  a control section indicating string indexes for the respective controls;
  a genre section indicating the control mappings for the respective application program genres;
  a diagram section containing one more graphics images of the control device, the one or more graphics images identifying locations of the human-actuated controls on the control device.

28. A computer-readable storage medium as recited in claim 23, wherein the obtained genre descriptor comprises:
  string indexes for the respective controls;
  graphics overlays that identify the human-actuated controls on the control device;
  coordinates of the graphics overlays.

29. A computer-readable storage medium as recited in claim 23, wherein the obtained genre descriptor comprises:
  string indexes for the respective controls;
  graphics overlays that identify the human-actuated controls on the control device;
  coordinates of the graphics overlays;
  coordinates for pointers to the human-actuated controls.

30. A computer-readable storage medium as recited in claim 23, wherein the obtained genre descriptor comprises:
  a header section indicating the number of controls on the control device and the number of genres for which control mappings exist in the non-volatile memory;
  a control section indicating string indexes for the respective controls, the control section also indicating graphics overlays that identify the human-actuated controls on the control device;
  a genre section indicating the control mappings for the respective application program genres.

31. A computer-readable storage medium as recited in claim 23, wherein the obtained genre descriptor comprises one more graphics images that identify the locations of the human-actuated controls on the control device.

32. A data transmission medium carrying a data structure comprising:
  a header section indicating the number of human-actuated controls on a computer peripheral and the number of application program genres for which control mappings exist in the data structure;
  a control section indicating HID string indexes for the respective controls on the computer peripheral;
  a genre section indicating control mappings for the respective application program genres, each of said genres comprising a set of semantics and not including commands interpretable by application programs classifiable in the genre.

33. A data transmission medium as recited in claim 32, further comprising:
  a diagram section containing one more graphics images of the computer peripheral, the one or more graphics images identifying locations of the human-actuated controls on the computer peripheral.

34. A data transmission medium as recited in claim 32, wherein the control section also indicates graphics overlays that identify the human-actuated controls on the computer peripheral.

35. A data transmission medium as recited in claim 32, further comprising a diagram section, the diagram section comprising graphics overlays that identify the human-actuated controls on the computer peripheral;

wherein the control section indicates coordinates of the graphics overlays and coordinates for pointers to the human-actuated controls.

36. A method of using an input device connected to a computing device with software executable on said computing device, said method comprising the acts of:

running an application program which is responsive to input, said application program being classified as a particular one of a plurality of application program genres, each of said genres comprising a set of semantics and not including commands interpretable by application programs classifiable in the genre;

querying a control device having a plurality of human-actuated controls, said control device storing a genre descriptor indicating actions to be performed by application programs in said particular application program genre in response to said human-actuated controls;

obtaining, in response to said querying act, said genre descriptor; and generating input to said application program in accordance with said genre descriptor.

37. A method as recited in claim 36, wherein the obtained genre descriptor comprises:

a control section indicating string indexes for the respective controls; and a genre section indicating the control mappings for the respective application program genres.

38. A method as recited in claim 36, further comprising:

retrieving one or more HID descriptors from the control device, the HID descriptors describing aspects of the human-actuated controls, the HID descriptors associating HID string indexes with the respective human-actuated controls;

wherein the obtained genre descriptor identifies the human-actuated controls by their HID string indexes.

39. A method as recited in claim 36, wherein the obtained genre descriptor comprises:

a control section indicating string indexes for the respective controls, the string indexes corresponding to separately defined human device interface (HID) string indexes; and a genre section indicating the control mappings for the respective application program genres, the control mappings identifying controls by their HID string indexes.

40. A method as recited in claim 36, wherein the obtained genre descriptor comprises:

a header section indicating the number of controls on the control device and the number of genres for which control mappings exist in the genre descriptor;

a control section indicating string indexes for the respective controls;

a genre section indicating the control mappings for the respective application program genres; and a diagram section containing one more graphics images of the control device, the one or more graphics images identifying locations of the human-actuated controls on the control device.

41. A method as recited in claim 36, wherein the obtained genre descriptor comprises:

string indexes for the respective controls;

graphics overlays that identify the human-actuated controls on the control device; and coordinates of the graphics overlays.

42. A method as recited in claim 36, wherein the obtained genre descriptor comprises:

string indexes for the respective controls;

graphics overlays that identify the human-actuated controls on the control device;

coordinates of the graphics overlays;

coordinates for pointers to the human-actuated controls.

43. A method as recited in claim 36, wherein the obtained genre descriptor comprises:

a header section indicating the number of controls on the control device and the number of genres for which control mappings exist in the non-volatile memory;

a control section indicating string indexes for the respective controls, the control section also indicating graphics overlays that identify the human-actuated controls on the control device; and a genre section indicating the control mappings for the respective application program genres.

44. A method as recited in claim 36, wherein the obtained genre descriptor comprises one more graphics images that identify the locations of the human-actuated controls on the control device.

45. A method of enabling the use of an application program that executes on a computing device with a control device having human-actuated controls, said method comprising the acts of:

defining a plurality of application program genres, each of said genres comprising a set of semantics and not including commands interpretable by application programs classifiable in the genre;

creating a genre descriptor, said genre descriptor indicating, for each one of said plurality of application program genres, actions to be performed by application programs in the respective application program genres in response to said human-actuated controls;

storing said genre descriptor in a memory of said control device, said memory being communicatively coupleable to said computing device whereby said genre descriptor is accessible to said computing device.

46. A method as recited in claim 45, wherein the obtained genre descriptor comprises:

a control section indicating string indexes for the respective controls; and a genre section indicating the control mappings for the respective application program genres.

47. A method as recited in claim 45, further comprising:

retrieving one or more HID descriptors from the control device, the HID descriptors describing aspects of the human-actuated controls, the HID descriptors associating HID string indexes with the respective human-actuated controls;

wherein the obtained genre descriptor identifies the human-actuated controls by their HID string indexes.

48. A method as recited in claim 45, wherein the obtained genre descriptor comprises:

a control section indicating string indexes for the respective controls, the string indexes corresponding to separately defined human device interface (HID) string indexes; and a genre section indicating the control mappings for the respective application program genres, the control mappings identifying controls by their HID string indexes.

49. A method as recited in claim 45, wherein the obtained genre descriptor comprises:
  a header section indicating the number of controls on the control device and the number of genres for which control mappings exist in the genre descriptor;
  a control section indicating string indexes for the respective controls;
  a genre section indicating the control mappings for the respective application program genres; and
  a diagram section containing one more graphics images of the control device, the one or more graphics images identifying locations of the human-actuated controls on the control device.

50. A method as recited in claim 45, wherein the obtained genre descriptor comprises:
  string indexes for the respective controls;
  graphics overlays that identify the human-actuated controls on the control device; and
  coordinates of the graphics overlays.

51. A method as recited in claim 45, wherein the obtained genre descriptor comprises:
  string indexes for the respective controls;
  graphics overlays that identify the human-actuated controls on the control device;
  coordinates of the graphics overlays;
  coordinates for pointers to the human-actuated controls.

52. A method as recited in claim 45, wherein the obtained genre descriptor comprises:
  a header section indicating the number of controls on the control device and the number of genres for which control mappings exist in the non-volatile memory;
  a control section indicating string indexes for the respective controls, the control section also indicating graphics overlays that identify the human-actuated controls on the control device; and
  a genre section indicating the control mappings for the respective application program genres.

53. A method as recited in claim 45, wherein the obtained genre descriptor comprises one more graphics images that identify the locations of the human-actuated controls on the control device.

* * * * *